United States Patent
Li et al.

(10) Patent No.: US 8,954,280 B2
(45) Date of Patent: Feb. 10, 2015

(54) METHODS AND SYSTEMS FOR DETERMINING FORMATION PARAMETERS USING A ROTATING TOOL EQUIPPED WITH TILTED ANTENNA LOOPS

(75) Inventors: Shanjun Li, Katy, TX (US);
Hsu-Hsiang Wu, Sugar Land, TX (US);
Michael Bittar, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 738 days.

(21) Appl. No.: 13/101,889

(22) Filed: May 5, 2011

(65) Prior Publication Data
US 2012/0283951 A1 Nov. 8, 2012

(51) Int. Cl.
G01V 3/18 (2006.01)
G01V 9/00 (2006.01)
G01V 3/30 (2006.01)

(52) U.S. Cl.
CPC .................................. *G01V 3/30* (2013.01)
USPC ......................... 702/7; 702/6; 702/9; 702/11

(58) Field of Classification Search
CPC ........................................................ G01V 3/30
USPC .............................................. 702/6, 7, 9, 11
See application file for complete search history.

(56) References Cited

U.S. PATENT DOCUMENTS

| 6,353,321 | B1 * | 3/2002 | Bittar | 324/338 |
| 6,476,609 | B1 | 11/2002 | Bittar | |
| 6,911,824 | B2 | 6/2005 | Bittar | 324/338 |
| 7,019,528 | B2 | 3/2006 | Bittar | 324/337 |
| 7,138,803 | B2 | 11/2006 | Bittar | 324/337 |
| 7,265,552 | B2 | 9/2007 | Bittar | 324/337 |
| 2009/0302851 | A1 | 12/2009 | Bittar et al. | 324/338 |
| 2010/0123462 | A1 | 5/2010 | Bittar | 324/369 |

FOREIGN PATENT DOCUMENTS

| WO | 2008/076130 A1 | 6/2008 | |
| WO | WO 2008/076130 | 6/2008 | E21B 25/16 |
| WO | WO 2009/131584 | 10/2009 | E21B 47/09 |
| WO | WO 2010/074678 | 7/2010 | E21B 45/00 |

OTHER PUBLICATIONS

Notice of Acceptance with Claims as Accepted mailed on Oct. 1, 2013 in corresponding Australian Patent Application No. 2012202505, 5 pgs.
Patent Examination Report No. 1, mailed Nov. 29, 2012 in corresponding Australian Patent Application No. 2012202505, 4 pgs.

\* cited by examiner

*Primary Examiner* — Janet Suglo
(74) *Attorney, Agent, or Firm* — Benjamin D. Fite; Baker Botts L.L.P.

(57) ABSTRACT

Methods and systems for characterizing a formation are disclosed. A tool is placed in the formation. The tool comprises a perpendicular antenna set and a parallel antenna set. The perpendicular antenna set comprises at least one transmitter antenna oriented perpendicular to at least one receiver antenna and the parallel antenna set comprises at least one transmitter antenna oriented parallel to at least one receiver antenna. Data is obtained from the tool and used to determine a compensated geosignal for each of the perpendicular antenna set and the parallel antenna set. The determined compensated geosignal is used to characterize the formation.

14 Claims, 16 Drawing Sheets

METHODS AND SYSTEMS FOR DETERMINING FORMATION PARAMETERS USING A ROTATING TOOL EQUIPPED WITH TILTED ANTENNA LOOPS

BACKGROUND

The basic techniques for electromagnetic logging for earth formations are well known. For instance, induction logging to determine resistivity (or its inverse, conductivity) of earth formations adjacent a borehole has long been a standard and important technique in the search for and recovery of hydrocarbons. Generally, a transmitter transmits an electromagnetic signal that passes through formation materials around the borehole and induces a signal in one or more receivers. The properties of the signal received, such as its amplitude and/or phase, are influenced by the formation resistivity, enabling resistivity measurements to be made. The measured signal characteristics and/or formation properties calculated therefrom may be recorded as a function of the tool's depth or position in the borehole, yielding a formation log that can be used to analyze the formation.

The resistivity of a given formation may be isotropic (equal in all directions) or anisotropic (unequal in different directions). In electrically anisotropic formations, the anisotropy is generally attributable to extremely fine layering during the sedimentary build-up of the formation. As a result, in a formation Cartesian coordinate system oriented such that the x-y plane is parallel to the formation layers and the z axis is perpendicular to the formation layers, resistivities Rx and Ry in the x and y directions, respectively, tend to be similar, but resistivity Rz in the z direction tends to be different. The resistivity in a direction parallel to the formation plane (i.e., the x-y plane) is known as the horizontal resistivity, Rh, and the resistivity in the direction perpendicular to the plane of the formation (i.e., the z direction) is known as the vertical resistivity, Rv. The index of anisotropy, $\eta$, is defined as $\eta=[Rv/Rh]^{1/2}$.

As a further complication to measuring formation resistivity, boreholes are generally perpendicular to formation beds. The angle between the axis of the well bore and the orientation of the formation beds (as represented by the normal vector) has two components. These components are the dip angle and the strike angle. The dip angle is the angle between the borehole axis and the normal vector for the formation bed. The strike angle is the direction in which the borehole's axis "leans away from" the normal vector.

Moreover, it is critical to distinguish effects between formation anisotropy and formation boundaries, especially in deviated and horizontal wells. Electromagnetic resistivity logging measurements are a complex function of both of the formation anisotropy and the formation boundaries. Specifically, when operating a logging tool downhole, measurements may be influenced by various environmental effects such as formation anisotropy, boundaries of layered media, borehole effect, etc. Only by 1 dimensional ("1D") inversion can one possibly distinguish these effects and further invert formation parameters such as formation anisotropy, relative dip angle and formation boundaries. However, the accuracy of 1D inversion is dependent on the logging tool's sensitivity to formation parameters, and it is typically difficult to have a good distinction between effects of formation anisotropy and formation boundaries.

BRIEF DESCRIPTION OF THE DRAWINGS

These drawings illustrate certain aspects of some of the embodiments of the present invention, and should not be used to limit or define the invention.

Figure 3:
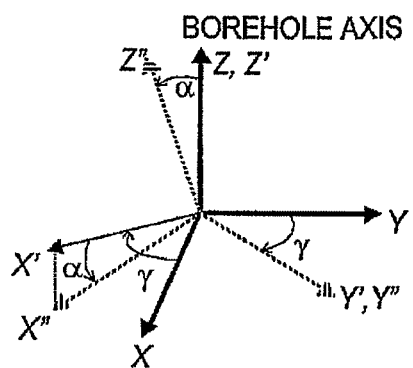
FIG. 3 shows a relationship between the orientation of a borehole and a dipping formation bed.

While embodiments of this disclosure have been depicted and described and are defined by reference to example embodiments of the disclosure, such references do not imply a limitation on the disclosure, and no such limitation is to be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DETAILED DESCRIPTION

The present invention relates to blending operations and, more particularly, to methods and systems for blending fluids used in subterranean operations.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory ("RAM"), one or more processing resources such as a central processing unit ("CPU") or hardware or software control logic, ROM, and/or other types of nonvolatile memory. Additional components of the information handling system may include one or more disk drives, one or more network ports for communication with external devices as well as various input and output ("I/O") devices, such as a keyboard, a mouse, and a video display. The information handling system may also include one or more buses operable to transmit communications between the various hardware components.

For the purposes of this disclosure, computer-readable media may include any instrumentality or aggregation of instrumentalities that may retain data and/or instructions for a period of time. Computer-readable media may include, for example, without limitation, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory ("EEPROM"), and/or flash memory; as well as communications media such wires, optical fibers, microwaves, radio waves, and other electromagnetic and/or optical carriers; and/or any combination of the foregoing.

Illustrative embodiments of the present invention are described in detail herein. In the interest of clarity, not all features of an actual implementation may be described in this specification. It will of course be appreciated that in the development of any such actual embodiment, numerous implementation-specific decisions may be made to achieve the specific implementation goals, which may vary from one implementation to another. Moreover, it will be appreciated that such a development effort might be complex and time-consuming, but would nevertheless be a routine undertaking for those of ordinary skill in the art having the benefit of the present disclosure.

To facilitate a better understanding of the present invention, the following examples of certain embodiments are given. In no way should the following examples be read to limit, or define, the scope of the invention. Embodiments of the present disclosure may be applicable to horizontal, vertical, deviated, or otherwise nonlinear wellbores in any type of subterranean formation. Embodiments may be applicable to injection wells as well as production wells, including hydrocarbon wells. Embodiments may be implemented using a tool that is made suitable for testing, retrieval and sampling along sections of the formation. Embodiments may be implemented with tools that, for example, may be conveyed through a flow passage in tubular string or using a wireline, slickline, coiled tubing, downhole robot or the like. Devices and methods in accordance with certain embodiments may be used in one or more of wireline, measurement-while-drilling ("MWD") and logging-while-drilling ("LWD") operations. "Measurement-while-drilling" is the term generally used for measuring conditions downhole concerning the movement and location of the drilling assembly while the drilling continues. "Logging-while-drilling" is the term generally used for similar techniques that concentrate more on formation parameter measurement.

The terms "couple" or "couples," as used herein are intended to mean either an indirect or direct connection. Thus, if a first device couples to a second device, that connection may be through a direct connection, or through an indirect electrical connection via other devices and connections. The term "upstream" as used herein means along a flow path towards the source of the flow, and the term "downstream" as used herein means along a flow path away from the source of the flow. The term "uphole" as used herein means along the drillstring or the hole from the distal end towards the surface, and "downhole" as used herein means along the drillstring or the hole from the surface towards the distal end.

It will be understood that the term "oil well drilling equipment" or "oil well drilling system" is not intended to limit the use of the equipment and processes described with those terms to drilling an oil well. The terms also encompass drilling natural gas wells or hydrocarbon wells in general. Further, such wells can be used for production, monitoring, or injection in relation to the recovery of hydrocarbons or other materials from the subsurface.

The present application discloses processing schemes for identification of formation anisotropy and boundary position using electromagnetic ("EM") logging tools equipped with tilt antenna systems. Using the rotating measurements of the logging tool, the invention introduces several defined signals from tilted antenna systems that may be used to directly discriminate formation anisotropy from raw measurements, determine azimuthal angle of formation anisotropy and further determine boundary positions.

Figure 1:
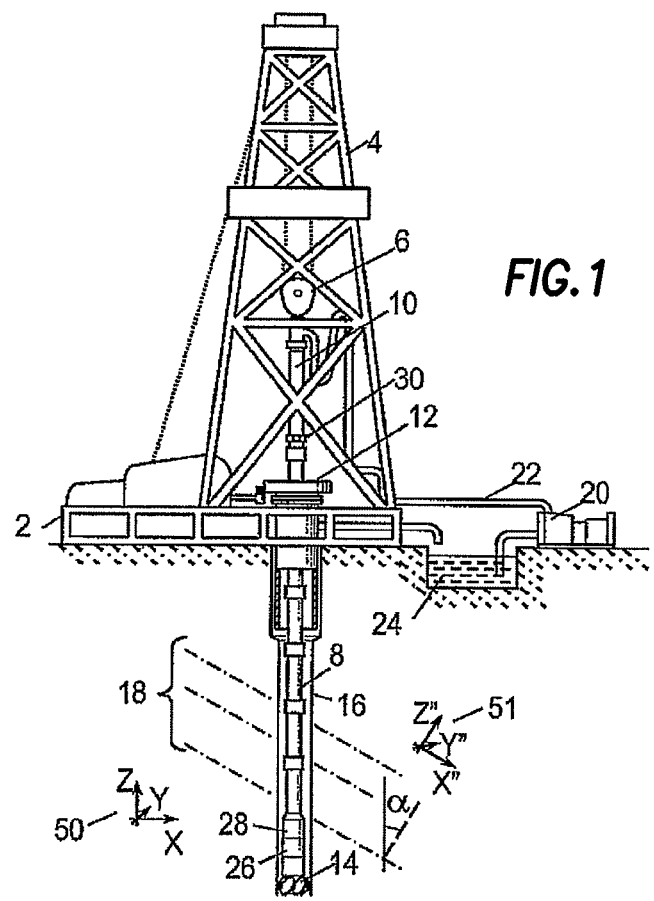
FIG. 1 shows an illustrative logging while drilling environment including dipping formation beds.

Turning now to FIG. 1, an illustrative logging while drilling ("LWD") environment is shown. A drilling platform 2 supports a derrick 4 having a traveling block 6 for raising and lowering a drill string 8. A kelly 10 supports the drill string 8 as it is lowered through a rotary table 12. A drill bit 14 is driven by a downhole motor and/or rotation of the drill string 8. As bit 14 rotates, it creates a borehole 16 that passes through various formations 18. A pump 20 may circulate drilling fluid through a feed pipe 22 to kelly 10, downhole through the interior of drill string 8, through orifices in drill bit 14, back to the surface via the annulus around drill string 8, and into a retention pit 24. The drilling fluid transports cuttings from the borehole into the pit 24 and aids in maintaining the borehole integrity.

An electromagnetic resistivity logging tool 26 may be integrated into the bottom-hole assembly near the bit 14. As the bit extends the borehole through the formations, logging tool 26 collects measurements relating to various formation properties as well as the tool orientation and position and various other drilling conditions. The orientation measurements may be performed using an azimuthal orientation indicator, which may include magnetometers, inclinometers, and/or accelerometers, though other sensor types such as gyroscopes may be used in some embodiments, the tool includes a 3-axis fluxgate magnetometer and a 3-axis accelerometer. The logging tool 26 may take the form of a drill collar, i.e., a thick-walled tubular that provides weight and rigidity to aid the drilling process. A telemetry sub 28 may be included to transfer tool measurements to a surface receiver 30 and to receive commands from the surface receiver 30.

In one embodiment, rotational position indicator array may contain both a 3-axis fluxgate magnetometer and a 3-axis accelerometer. As would be appreciated by those of ordinary skill in the art, with the benefit of this disclosure, the combination of those two sensor systems enables the measurement of the tool face, inclination, and azimuth orientation angles of the borehole. The tool face and hole inclination angles are calculated from the accelerometer sensor output. The magnetometer sensor outputs are used to calculate the hole azimuth. With the tool face, the hole inclination, and the hole azimuth information, a tool in accordance with the present invention can be used to steer the bit to the desirable bed. Specifically, the response difference or the response ratio can be used effectively to enter a desired payzone or to stay within the payzone of interest.

Figure 2:
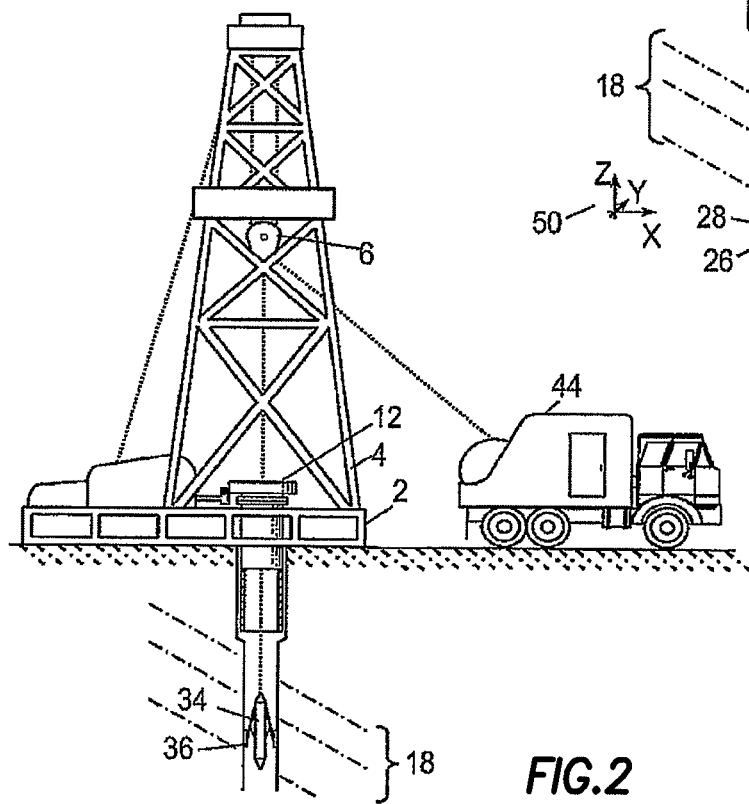
FIG. 2 shows an illustrative wireline logging environment including dipping formation beds.

At various times during the drilling process, the drill string 8 may be removed from the borehole as shown in FIG. 2. Once the drill string has been removed, logging operations can be conducted using a wireline logging tool 34, i.e., a sensing instrument sonde suspended by a cable having conductors for transporting power to the tool and telemetry from the tool to the surface. A resistivity imaging portion of the logging tool 34 may have centralizing arms 36 that center the tool within the borehole as the tool is pulled uphole. A logging facility 44 may collect measurements from the logging tool 34, and may include computing facilities for processing and storing the measurements gathered by the logging tool.

Returning now to FIG. 1, it shows that the formations 18 are not perpendicular to the borehole, which may occur naturally or due to directional drilling operations. The borehole may have a Cartesian coordinate system 50 defined in accordance with the borehole's long axis (the z-axis) and the north side (or alternatively, the high side) of the hole (the x-axis). The formations 18, when characterized as a plane, may have a Cartesian coordinate system 51 defined in accordance with the normal to the plane (the z"-axis) and the direction of steepest descent (the x"-axis). As shown in FIG. 3, the two Cartesian coordinate systems are related by two rotations. Beginning with the borehole's Cartesian coordinate system (x,y,z), a first rotation of angle γ is made about the z-axis. The resulting Cartesian coordinate system is denoted (x',y',z'). Angle γ is the relative strike angle, which indicates the direction of the formation dip relative to the borehole's Cartesian coordinate system. A second rotation of angle α is then made about the y' axis. This aligns the borehole Cartesian coordinate system with the formation Cartesian coordinate system. Angle α is the relative dip angle, which is the slope angle of the beds relative to the long axis of the borehole.

The vertical resistivity is generally found to be the resistivity as measured perpendicular to the plane of the formation, and the horizontal resistivity is the resistivity as measured within the plane of the formation. Determination of each of these parameters (dip angle, strike angle, vertical resistivity, and horizontal resistivity) is desirable.

Figure 4:
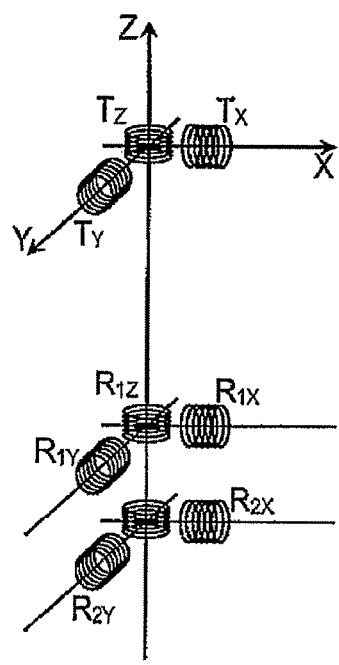
FIG. 4 shows a hypothetical antenna arrangement for a tool having an orthogonal triaxial transmitter and two orthogonal triaxial receivers.

FIG. 4 shows a hypothetical antenna configuration for a multi-component electromagnetic resistivity logging tool which may be embodied as a wireline tool as well as a LWD tool. A triad of transmitter coils $T_X$, $T_Y$, and $T_Z$, each oriented along a respective axis, may be provided. At least one triad of similarly oriented receiver coils $R_{1X}$, $R_{1Y}$, and $R_{1Z}$ may also be provided. For received signal measurements relative to the amplitude and phase of the transmitted signal (sometimes called "absolute" measurements) only one receiver triad would be used. A second triad of similarly oriented receiver coils pairs $R_{2X}$, $R_{2Y}$, and $R_{2Z}$ may also be provided when differential measurements are desired (e.g., a signal amplitude ratio or a phase difference between receiver coils oriented along a given axis). Differential measurements may offer increased spatial resolution.

Moran and Gianzero, in "Effects of Formation Anisotropy on Resistivity Logging Measurements" Geophysics, Vol. 44, No. 7, p. 1266 (1979), noted that the magnetic field h in the receiver coils can be represented in terms of the magnetic moments m at the transmitters and a coupling matrix C:

$$h = Cm \quad (1)$$

In express form, equation (1) is:

$$\begin{bmatrix} Hx \\ Hy \\ Hz \end{bmatrix} = \begin{bmatrix} Cxx & Cxy & Cxz \\ Cyx & Cyy & Cyz \\ Czx & Czy & Czz \end{bmatrix} \begin{bmatrix} Mx \\ My \\ Mz \end{bmatrix} \quad (2)$$

where Mx, My, and Mz are the magnetic moments (proportional to transmit signal strength) created by transmitters Tx, Ty, and Tz, respectively. Hx, Hy, Hz are the magnetic fields (proportional to received signal strength) at the receiver antennas Rx, Ry, and Rz, respectively.

In the antenna configuration of FIG. 4, if each transmitter is fired in turn, and signal measurements are made at each receiver in response to each firing, nine absolute or differential measurements are obtained. These nine measurements enable the determination of a complete coupling matrix C. ($C_{IJ}=a_{IJ}v_I^J$, where I is the index for receiver Rx, Ry, or Rz, J is the index for transmitter Tx, Ty, or Tz, $a_{IJ}$ is a constant determined by the tool design, and $v_I^J$ is a complex value representing the signal amplitude and phase shift measured by receiver I in response to the firing of transmitter J.). Knowledge of the complete coupling matrix enables the determination of dip angle, strike angle, vertical resistivity, and horizontal resistivity. A number of techniques may be used to determine these parameters. For example, dip and strike angle may be determined from coupling matrix values as explained by Li Gao and Stanley Gianzero, U.S. Pat. No. 6,727,706, "Virtual Steering of Induction Tool for Determination of Formation Dip Angle." Given these angles, vertical and horizontal resistivity can be determined in accordance with equations provided by Michael Bittar, U.S. Pat. No. 7,019,528 "Electromagnetic Wave Resistivity Tool Having a Tilted Antenna for Geosteering Within a Desired Payzone." Alternatively, a simultaneous solution for these parameters may be found as described in the Bittar reference.

Figure 5:
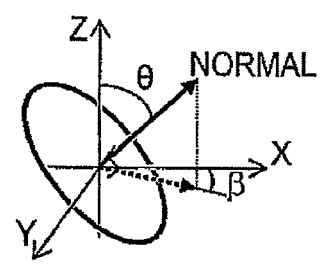
FIG. 5 shows angles for defining the orientation of a tilted antenna.

FIG. 5 shows two angles that may be used to specify the orientation of a coil antenna. The coil antenna may be considered as residing in a plane having a normal vector. Tilt angle θ is the angle between the longitudinal axis of the tool and the normal vector. Azimuth angle β is the angle between the projection of the normal vector in the X-Y plane and the tool scribe line. Alternatively, in the downhole context, azimuthal angle β may represent the angle between projection of the normal vector in the X-Y plane and the x-axis of the borehole Cartesian coordinate system. As would be appreciated by those of ordinary skill in the art, with the benefit of this disclosure, the methods and systems disclosed herein are not limited to any particular azimuthal angle. Specifically, the transmitter and receiver coils may have any azimuthal angle suitable for a particular application. Moreover, although the present application discloses an embodiment with a transmitter coil having the same azimuthal angle as a receiver coil, as would be appreciated by those of ordinary skill in the art, with the benefit of this disclosure, the methods and systems disclosed herein may also be applied in instances where the transmitter coil(s) and the receiver coil(s) have differing azimuthal angles. For instance, in one exemplary embodiment, one or both of the transmitter coil(s) and the receiver coil(s) may be positioned in a window inside the tool facing outwards rather than being wrapped around the tool. Further, in one embodiment, the normal vector of the coil antenna may be co-planar with the X-Y plane.

It is noted that three transmitter antenna orientations and three receiver antenna orientations are employed in the antenna configuration of FIG. 4. It has been discovered that when tool rotation is exploited, it is possible to determine the full coupling matrix with only one transmitter and two receiver antenna orientations (or equivalently, one receiver and two transmitter antenna orientations). Moreover, with certain assumptions about the configuration of the formation, one transmitter and receiver antenna orientation may be sufficient.

Figure 6:
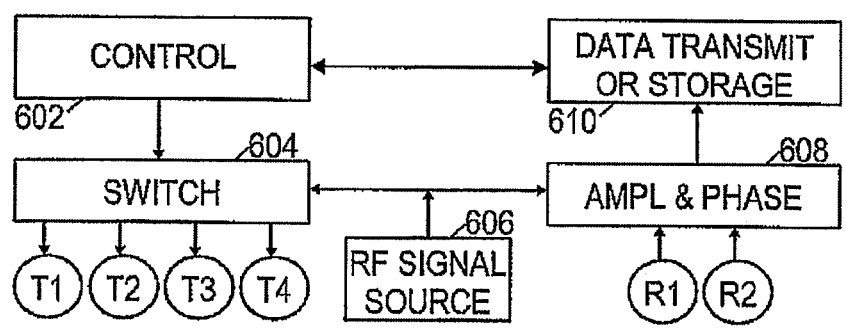
FIG. 6 shows a block diagram of an exemplary electronics module for an electromagnetic resistivity tool.

Before considering various tools having specific antenna configurations, the electronics common to each tool are described. FIG. 6 shows a functional block diagram of the electronics for a resistivity tool. The electronics include a control module 602 that is coupled to an analog switch 604. Analog switch 604 is configured to drive any one of the transmitter coils $T_1$, $T_2$, $T_3$, $T_4$ with an alternating current ("AC") signal from a signal source 606. In some embodiments, the signal source provides radio frequency signals. The control module 602 preferably selects a transmitter coil, pauses long enough for transients to die out, then signals data storage/transmit module 610 to accept an amplitude and phase sample of the signals received by each of the receivers. The control module 602 preferably repeats this process sequentially for each of the transmitters. The amplitude and phase shift values are provided by amplitude and phase shift detector 608 which is coupled to each of the receiver coils $R_1$ and $R_2$ for this purpose.

Control module 602 may process the amplitude and phase shift measurements to obtain compensated measurements and/or measurement averages. The raw, compensated, or averaged measurements, may be transmitted to the surface for processing to determine dip and strike angles, vertical and horizontal resistivity, and other information such as (i) distance to nearest bed boundary, (ii) direction of nearest bed boundary, and (iii) resistivity of any nearby adjacent beds. The data storage/transmitter module 610 may be coupled to telemetry unit 28 (FIG. 1) to transmit signal measurements to the surface. Telemetry unit 28 can use any of several known techniques for transmitting information to the surface, including, but not limited to, (1) mud pressure pulse; (2) hard-wire connection; (3) acoustic waves; and (4) electromagnetic waves.

Figure 7:
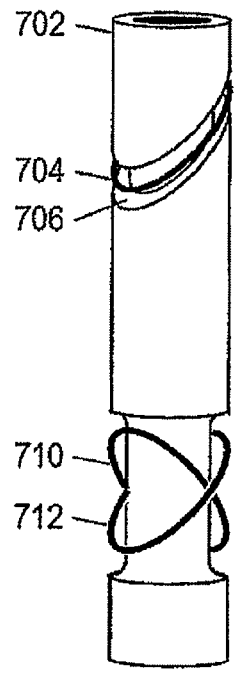
FIG. 7 shows an illustrative electromagnetic resistivity logging tool having tilted transmitter and receiver antennas.

FIG. 7 shows an electromagnetic resistivity logging tool 702 having only two receiver antenna orientations. The tool 702 is provided with one or more regions 706 of reduced diameter. A wire coil 704 is placed in the region 706 and in some embodiments is spaced away from the surface of subassembly 702 by a constant distance. To mechanically support and protect the coil 704, a non-conductive filler material (not shown) such as epoxy, rubber, or ceramic may be used in the reduced-diameter regions 706. Coil 704 is a transmitter coil, and coils 710 and 712 are receiving coils. In operation, transmitter coil 704 transmits an interrogating electromagnetic signal which propagates through the borehole and surrounding formation. Receiver coils 710, 712 detect the interrogating electromagnetic signal and provide a measure of the electromagnetic signal's amplitude attenuation and phase shift. For differential measurements, additional receiver coils parallel to coils 710, 712 may be provided at an axially spaced distance. From the absolute or differential amplitude attenuation and phase shift measurements, the coupling matrix components can be determined and used as the basis for determining formation parameters and as the basis for geosteering.

In one embodiment, the transmitter coil 704 may be spaced approximately 30 inches from the receiver coils 710, 712. The transmitter and receiver coils may comprise as little as one loop of wire, although more loops may provide additional signal power. The distance between the coils and the tool surface is preferably in the range from 1/16 inch to 3/4 inch, but may be larger. Transmitter coil 704 and receiver coil 712 may each have a tilt angle of about 45° and be aligned with the same azimuthal angle, while receiver coil 710 may have a tilt angle of about 45° and an azimuthal angle of 180° apart from receiver coil 712 (or equivalently, a tilt angle of minus 45° at the same azimuth angle as receiver coil 712). Accordingly, an electromagnetic resistivity logging tool may be provided which may include a rotational position sensor as well as transmitter and receiver coils.

Figure 8B:
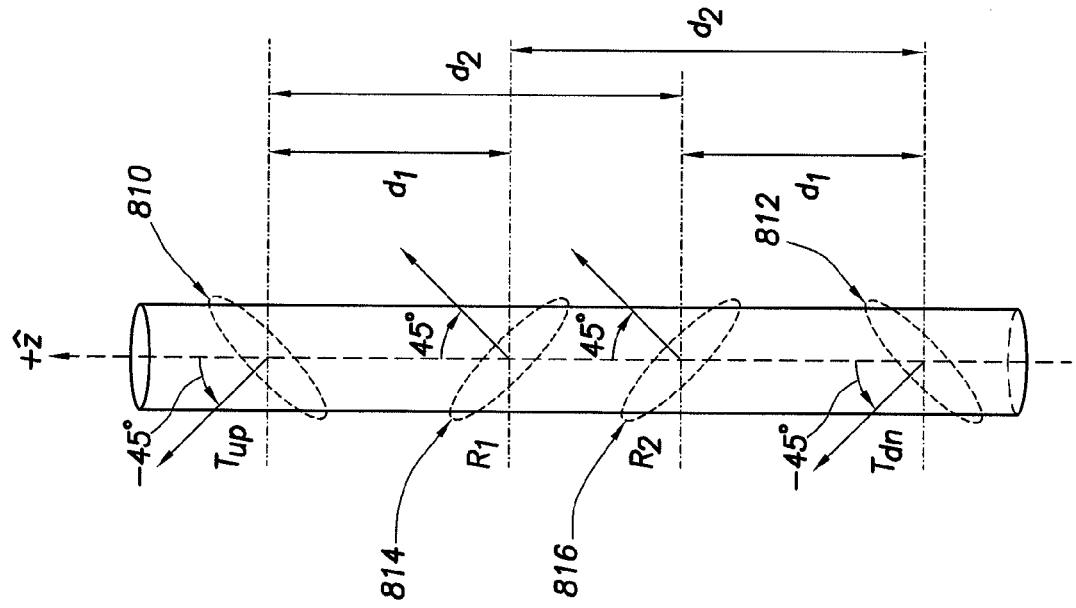
FIGS. 8a and 8b show an illustrative configuration of an antenna system equipped with tilted transmitters and tilter receivers.
Figure 8A:
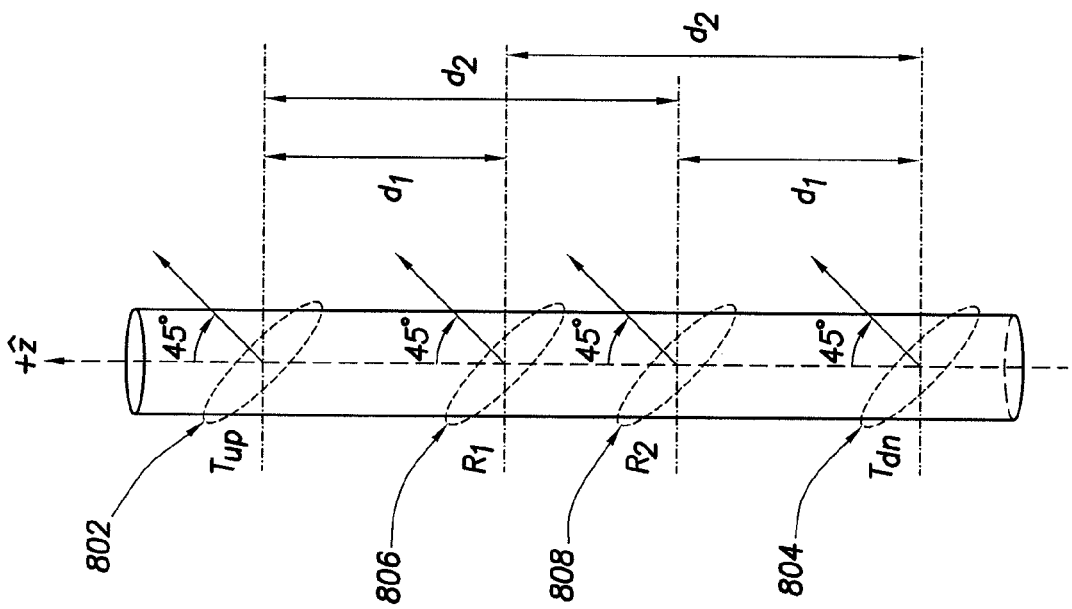
Figure 9:
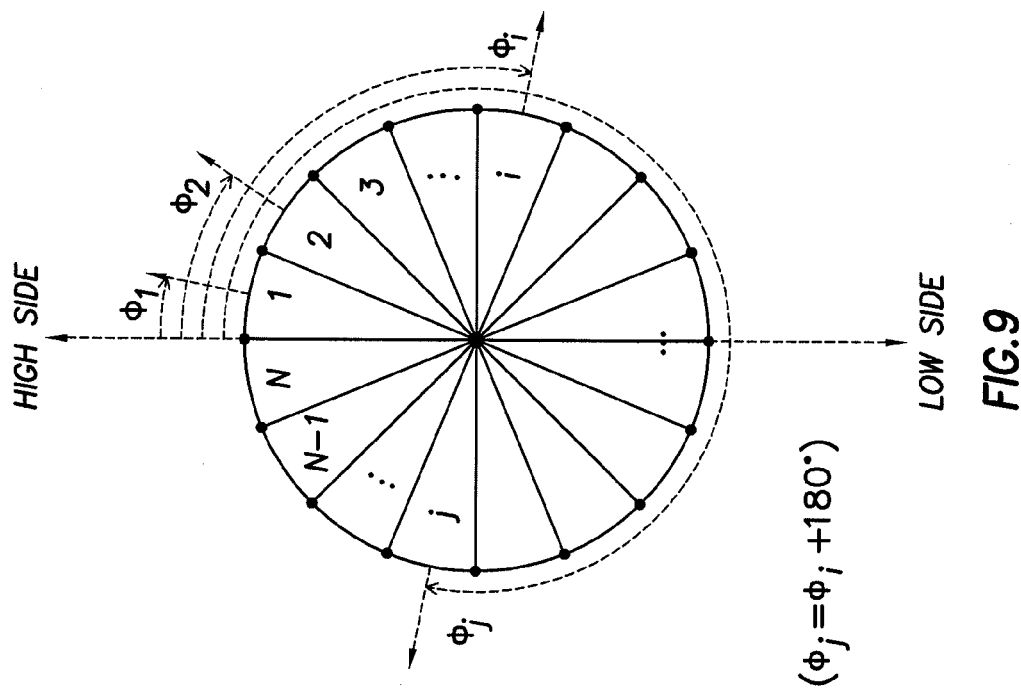
FIG. 9 shows an illustrative configuration of tool bin positions and corresponding azimuthal angles.

Turning now to FIGS. 8a and 8b, two antenna systems showing different relative orientations of transmitters and receivers are presented. Although shown separately, the two antenna systems of FIG. 8 may be incorporated into the same electromagnetic logging tool. For instance, FIG. 10, which is discussed in more detail below, shows an exemplary embodiment where the different orientations are incorporated in the same electromagnetic logging tool. FIG. 8a shows a first arrangement where the orientation of the transmitter loops 802, 804 is parallel to the orientation of the receiver loops 806, 808. In contrast, FIG. 8b shows a second arrangement where each transmitter loop 810, 812 is oriented perpendicular to each receiver loop 814, 816. The measured voltage on the receivers induced by the transmitters for the exemplary arrangement of FIG. 8 can be expressed as:

$$V^{pl} = \frac{V_{xx} - V_{yy}}{4}\cos 2\phi + \frac{V_{xy} + V_{yx}}{4}\sin 2\phi + \frac{V_{xz} + V_{zx}}{2}\cos\phi + \frac{V_{yz} + V_{zy}}{2}\sin\phi + \frac{2V_{zz} + V_{xx} + V_{yy}}{4} \quad (3a)$$

$$V^{pr} = -\frac{V_{xx} - V_{yy}}{4}\cos 2\phi - \frac{V_{xy} + V_{yx}}{4}\sin 2\phi - \frac{V_{xz} - V_{zx}}{2}\cos\phi - \frac{V_{yz} - V_{zy}}{2}\sin\phi + \frac{2V_{zz} + V_{xx} - V_{yy}}{4} \quad (3b)$$

where the $V^{pl}$ represents the measured voltage on the receivers 806, 808 in the parallel system and $V^{pr}$ represents the measured voltage on the receivers 814, 816 in the perpendicular system; $V_{ij}$ denotes the coupled voltage component measured at a receiver oriented in the j direction in response to the firing of a transmitter oriented in the i direction; and $\phi$ is the tool's azimuth angle. In practice, measurements of a complete tool rotation may be divided by N bins with each bin positioned at a distinct azimuthal angle, $\phi_k$, as shown in FIG. 9. Specifically, N is the total number of bins in the rotating tool and bin i with azimuthal angle $\phi_i$ and bin j with azimuthal angle $\phi_j$ are located opposite each other so that $\phi_j = \phi_i + 180°$. Accordingly, the measurements associated with bin i direction may be expressed as $$V^{pl}(\phi_i) = \frac{V_{xx} - V_{yy}}{4}\cos 2\phi_i + \frac{V_{xy} + V_{yx}}{4}\sin 2\phi_i + \frac{V_{xz} + V_{zx}}{2}\cos\phi_i + \frac{V_{yz} + V_{zy}}{2}\sin\phi_i + \frac{2V_{zz} + V_{xx} + V_{yy}}{4} \quad (4a)$$

$$V^{pr} = -\frac{V_{xx} - V_{yy}}{4}\cos 2\phi_i - \frac{V_{xy} + V_{yx}}{4}\sin 2\phi_i - \frac{V_{xz} - V_{zx}}{2}\cos\phi_i - \frac{V_{yz} - V_{zy}}{2}\sin\phi_i + \frac{2V_{zz} - V_{xx} - V_{yy}}{4} \quad (4b)$$

Meanwhile, as discussed above with reference to FIG. 9, bin j is in the direction opposite to bin i. According to the relations shown in Eq. (4) and the azimuthal relationship of bins i and j, four geo-signal responses may be defined with respect to the tool's azimuth angles as follows:

$$\begin{cases} V_{Geo1}^{pl}(\phi_i) = \dfrac{\frac{1}{2}\times(V^{pl}(\phi_i)-V^{pl}(\phi_j))}{\sum\limits_{k=1}^{N} V^{pl}(\phi_k)} \\ V_{Geo1}^{pr}(\phi_i) = \dfrac{\frac{1}{2}\times(V^{pr}(\phi_i)-V^{pr}(\phi_j))}{\sum\limits_{k=1}^{N} V^{pr}(\phi_k)} \end{cases}, i=1,2,\ldots,N \quad (5a)$$

$$\begin{cases} V_{Geo2}^{pl}(\phi_i) = \dfrac{\frac{1}{2}\times(V^{pl}(\phi_i)-V^{pl}(\phi_j))+\sum\limits_{k=1}^{N}V^{pl}(\phi_k)}{\sum\limits_{k=1}^{N} V^{pl}(\phi_k)} \\ V_{Geo2}^{pr}(\phi_i) = \dfrac{\frac{1}{2}\times(V^{pr}(\phi_i)-V^{pr}(\phi_j))+\sum\limits_{k=1}^{N}V^{pr}(\phi_k)}{\sum\limits_{k=1}^{N} V^{pr}(\phi_k)} \end{cases}, i=1,2,\ldots,N \quad (5b)$$

$$\begin{cases} V_{Geo3}^{pl}(\phi_i) = \dfrac{\frac{1}{2}\times(V^{pl}(\phi_i)-V^{pl}(\phi_j))}{\sum\limits_{k=1}^{N} V^{pl}(\phi_k)} \\ V_{Geo3}^{pr}(\phi_i) = \dfrac{\frac{1}{2}\times(V^{pr}(\phi_i)-V^{pr}(\phi_j))}{\sum\limits_{k=1}^{N} V^{pr}(\phi_k)} \end{cases}, i=1,2,\ldots,N \quad (5c)$$

$$\begin{cases} V_{Geo4}^{pl}(\phi_i) = \dfrac{V^{pl}(\phi_i)}{V^{pl}(\phi_j)} \\ V_{Geo4}^{pr}(\phi_i) = \dfrac{V^{pr}(\phi_i)}{V^{pr}(\phi_j)} \end{cases}, i=1,2,\ldots,N \quad (5d)$$

where $V_{Geok}^{pl}$ and $V_{Geok}^{pr}$ are defined geosignal responses on the basis of the parallel system and the perpendicular system, respectively; the lower index of Geok represents different kinds of geosignal definitions in Eq. (5) where k is from 1 to 4 to express Eqs. (5a)-(5d).

Each of the defined geosignal responses is unique and has different sensitivities to formation parameters, such as formation anisotropy, relative dip angle, and formation boundaries. To utilize those responses, one can either use real part and imaginary part of defined geosignal voltages in Eq. (5), or use those complex voltages in terms of corresponding phase and attenuation to show specific sensitivity to formation parameters. Moreover, both parallel and perpendicular systems are used simultaneously to directly determine formation anisotropy and formation boundaries. For instance, with respect to the geosignal defined in Eq. (5d), in a homogenous formation medium, the geosignal responses from the parallel system may be very sensitive to formation anisotropy if there is any, whereas those from the perpendicular system have no azimuth sensitivities to formation anisotropy.

Figure 10A:
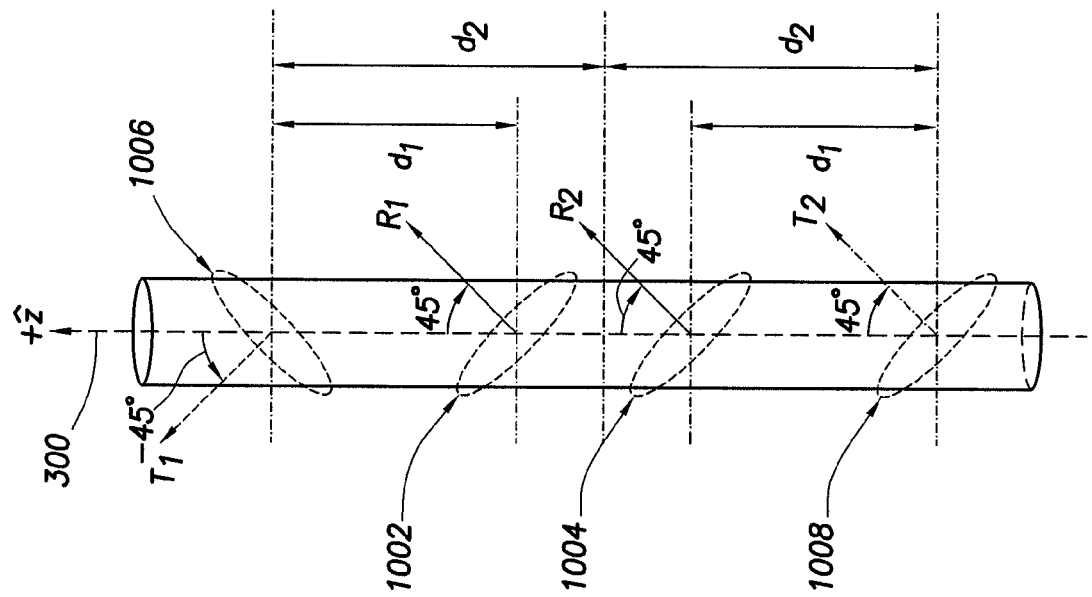
FIG. 10 show an illustrative configuration of an antenna system in accordance with an exemplary embodiment of the present invention.
Figure 10C:
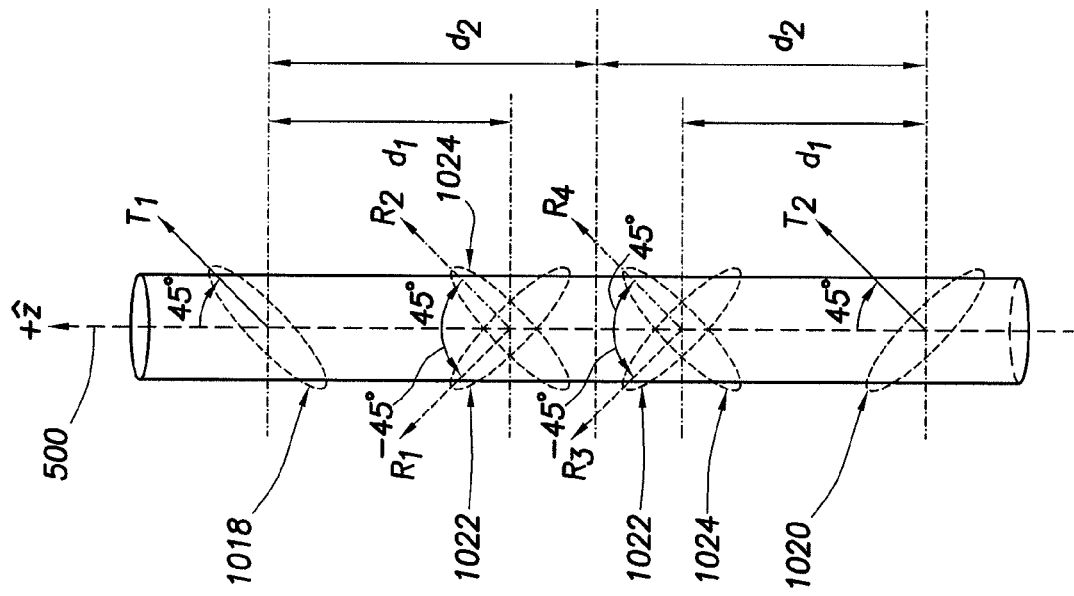
Figure 10B:
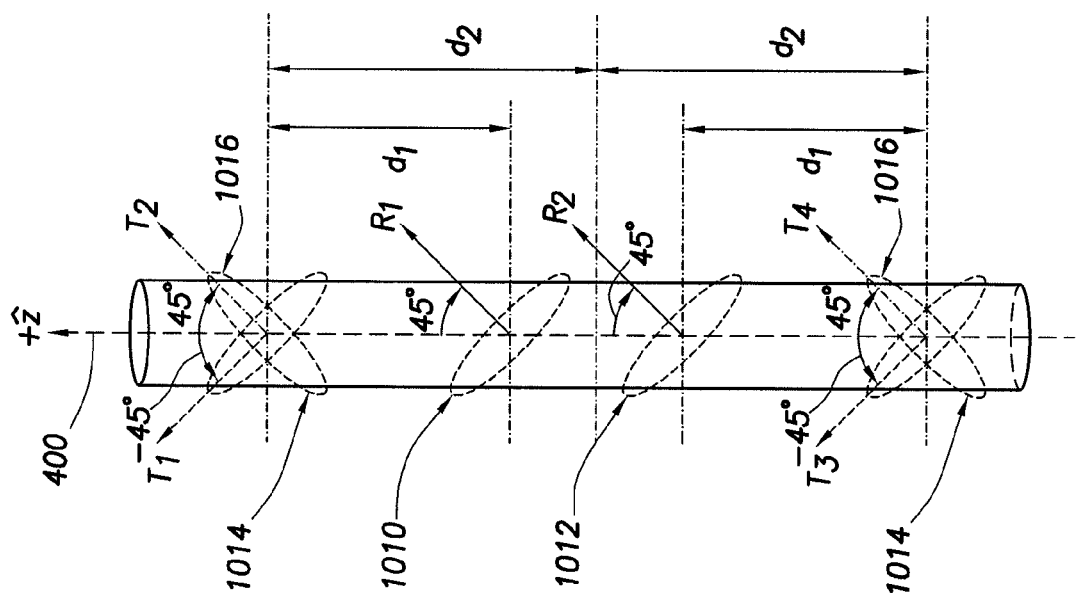

In practice, the structure of FIG. 8 may be implemented by the exemplary systems of FIG. 10 and defined geosignal responses may be compensated based on the structures in FIG. 10, so that downhole temperature and pressure effects on defined signals can be calibrated. The calibration methods are well known to those of ordinary skill in the art and will therefore not be discussed in detail herein. FIG. 10a depicts an exemplary embodiment with a first receiver antenna 1002 and a second receiver antenna 1004 which are parallel to each other. A first transmitter antenna 1006 is oriented perpendicular to the two receiver antennas and a second transmitter antenna 1008 is located parallel with the receiver antennas. In another exemplary embodiment shown in FIG. 10b, two receiver antennas 1010, 1012 may be located parallel to each other. Two sets of transmitter antennas may also be provided with each set including a first transmitter antenna 1014 that is parallel with the receiver antennas and a second transmitter antenna 1016 that is perpendicular to the receiver antennas. Finally, in a third exemplary embodiment, the tool may be designed to include a first transmitter antenna 1018 and a second transmitter antenna 1020. Two sets of receiver antennas may also be provided with each set including a first receiver antenna 1022 that is parallel with the transmitter antennas and a second receiver antenna 1024 that is perpendicular to the transmitter antennas. In each embodiment depicted in FIG. 10, the electromagnetic logging tool may be used to analyze the formation in accordance with an exemplary embodiment of the present invention.

Although FIGS. 8 and 10a depict two transmitters and two receivers, FIG. 10b depicts two receivers and two sets of transmitters and FIG. 10c depicts two transmitters and two sets of receivers, as would be appreciated by those of ordinary skill in the art, with the benefit of this disclosure, any symmetrically positioned even number of transmitters and receivers or transmitter sets and receiver sets may be used in conjunction with the present methods. For instance, in one embodiment, there may be 4 transmitters, 6 transmitters, 8 transmitters, 4 sets of transmitters, 6 sets of transmitters, etc. The same is true of the receivers.

Figure 11:
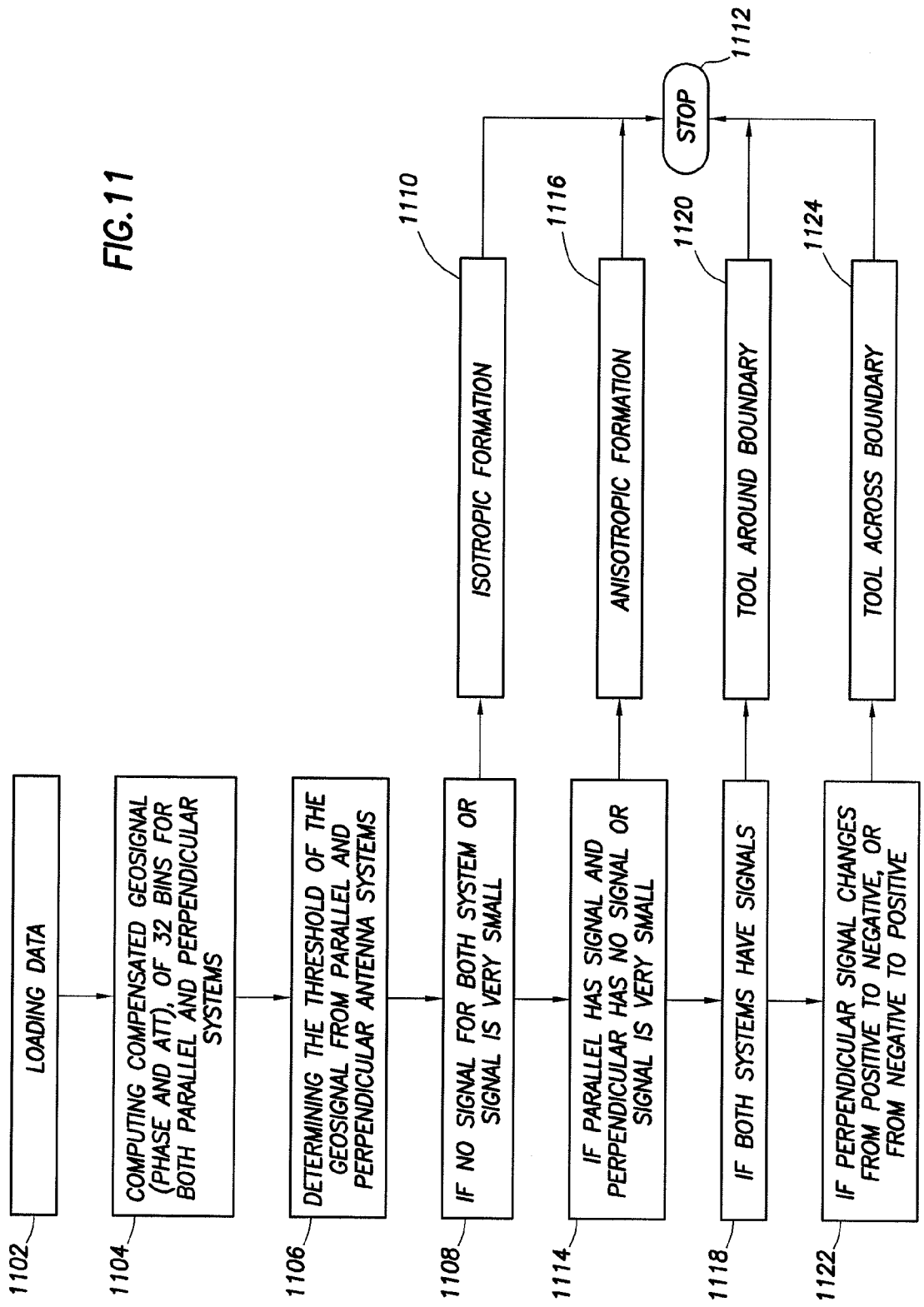
FIG. 11 shows a flow chart of method steps in accordance with an exemplary embodiment of the present invention.

FIG. 11 depicts the method steps for directly determining anisotropy formation and boundary conditions. First, at step 1102, data from the electromagnetic logging tool is obtained. In one exemplary embodiment, the data may be loaded onto an information handling system (not shown). Next, at step 1104, a compensated geosignal (phase and attenuation) may be determined for the 32 bins corresponding to different positions of the rotating tool for both the parallel and the perpendicular antenna systems oriented as discussed in conjunction with FIGS. 8 and 10 above. At step 1106, the threshold of the geosignal from the parallel antenna system and the perpendicular antenna system may be determined. At step 1108, it is determined if there is no signal for both of the parallel and the perpendicular systems. If there is no signal for either system or if the signal is very small, at step 1110 an isotropic formation is identified and the process may terminate at step 1112. If not, the process continues to step 1114. At step 1114, if the parallel antenna system demonstrates a signal and the perpendicular antenna system demonstrates no signal or a very small signal, an anisotropic formation is identified at step 1116 and the process terminates at step 1112. If not, the process continues to step 1118 where it is determined if both of the parallel and the perpendicular antenna systems demonstrate a signal. If that is the case, a tool around boundary is identified at step 1120 and the process terminates at step 1112. If not, the process continues to step 1122. At step 1122, if the perpendicular signal changes from positive to negative or from negative to positive, a tool across boundary is identified at step 1124 and the process will terminate at step 1112. As would be appreciated by those of ordinary skill in the art, with the benefit of this disclosure, in one exemplary embodiment at each step a minimum threshold value may be designated. A signal may then be considered to be present if its value exceeds that minimum threshold value and a signal may be considered non-existent if it falls below that minimum threshold.

As would be appreciated by those of ordinary skill in the art, with the benefit of this disclosure, the methods and systems disclosed herein are applicable to antenna systems with arbitrary tilt angle for transmitters and receivers. For instance, as shown in FIG. 8, the transmitter antenna (802, 804,810, 812) and the receiver antenna (806, 808, 814, 816) may be oriented at an angle of 45° and −45°. However, as would be appreciated by those of ordinary skill in the art, with the benefit of this disclosure, the present application is not limited to a specific tilt angle for the transmitter antenna and the receiver antenna. Accordingly, any symmetrical arrangement of tilted transmitters and tilted receivers may be used in a MWD tool in accordance with an exemplary embodiment of the present invention.

Further, as would be appreciated by those of ordinary skill in the art, with the benefit of this disclosure, based on the reciprocity theorem, antennas may operate equally well as transmitters or receivers. Accordingly, an antenna may be applied as a transmitter in one implementation and as a receiver in another. As a result, all the configurations of transmitters-receivers of the antenna systems disclosed herein may be interchangeable. Specifically, transmitters may be used as receivers and receivers may be used as transmitters.

Example I

Figure 12:
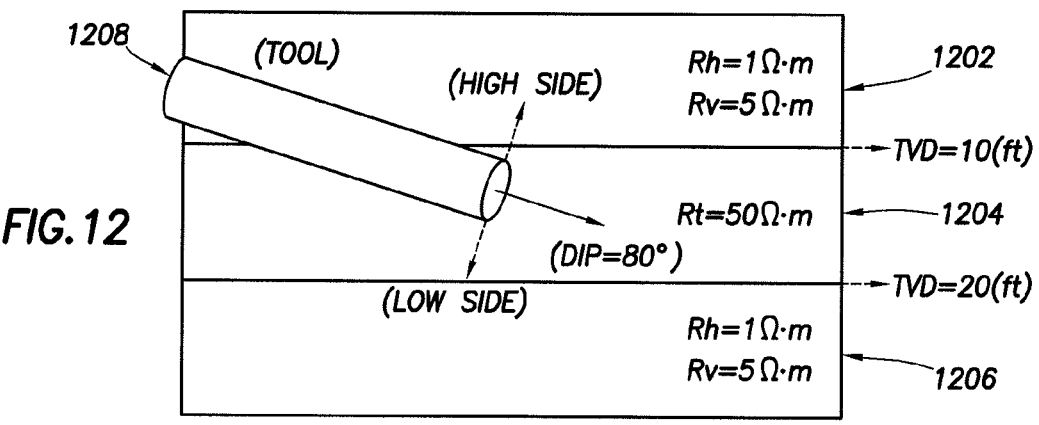
FIG. 12 shows an exemplary formation model analyzed in accordance with an exemplary embodiment of the present invention.
Figure 13A:
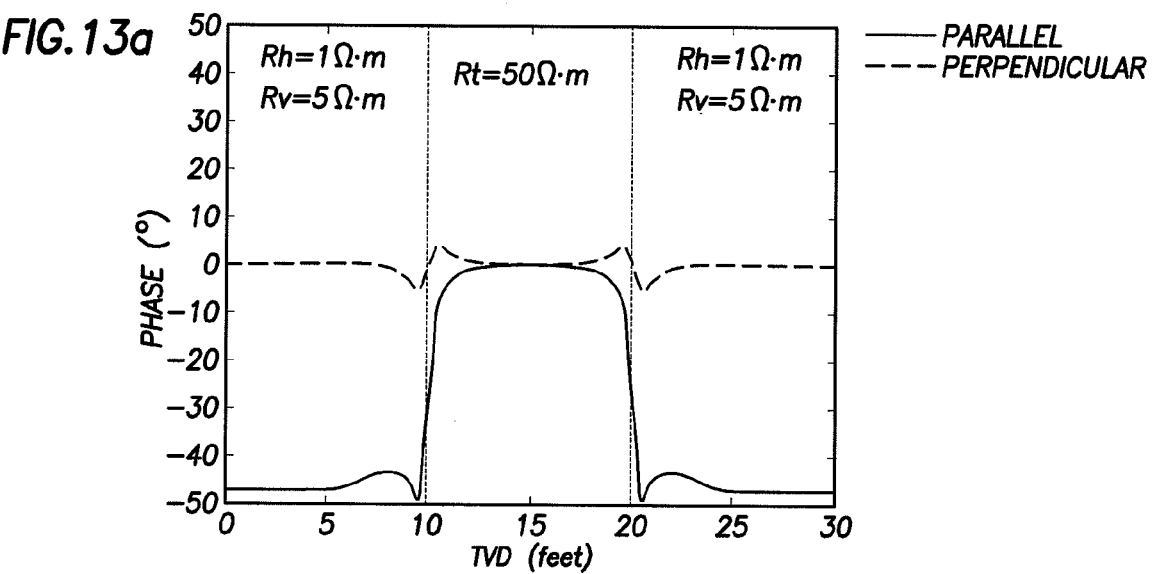
FIG. 13a depicts the compensated geosignal phase for the formation of FIG. 12 obtained in accordance with an exemplary embodiment of the present invention.
Figure 13B:
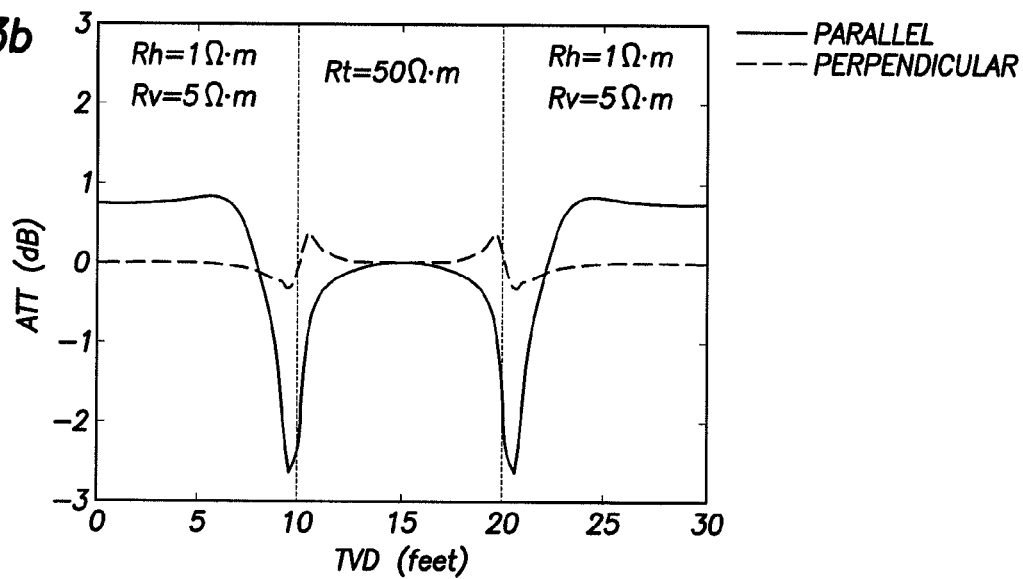
FIG. 13b depicts the attenuation response for the formation of FIG. 12 obtained in accordance with an exemplary embodiment of the present invention.

FIG. 12 depicts an exemplary 3-layer formation model. As would be appreciated by those of ordinary skill in the art, with the benefit of this disclosure, the structure in FIG. 12 is merely an example and does not limit the scope of the present invention. Specifically, the formation model may include more or less than three layers. In the exemplary formation model of FIG. 12, the top layer 1202 and the lowest layer 1206 are the same anisotropic formation with a horizontal resistivity ("Rh") of 1 Ω·m and a vertical resistivity ("Rv") of 5 Ω·m. The center layer 1204 of this exemplary formation model is isotropic with a formation resistivity of 50 Ω·m and a thickness of 10 feet. The tool 1208 may have a relative dip angle of 80°. FIG. 13a represents the compensated geosignal phase and FIG. 13b represents the attenuation responses at high side azimuthal direction of the tool 1208. In practice, the high side azimuthal direction may be defined by a magnetometer and/or gravity system of the tool. In a horizontal well, the high side is pointing up with respect to the earth. Modeling responses for this exemplary formation may be simulated using spacing of 32" (a d1 value of 28" and a d2 value of 36") at 500 kHz of parallel and perpendicular antenna structures in FIG. 8. While the tool 1208 is away from a different layer, geosignal responses reveal that the perpendicular antenna system (as shown in FIG. 8b) does not detect any signals until approaching a different layer. In contrast, the parallel antenna system (as shown in FIG. 8a) senses anisotropy effect, if any.

Figure 13C:
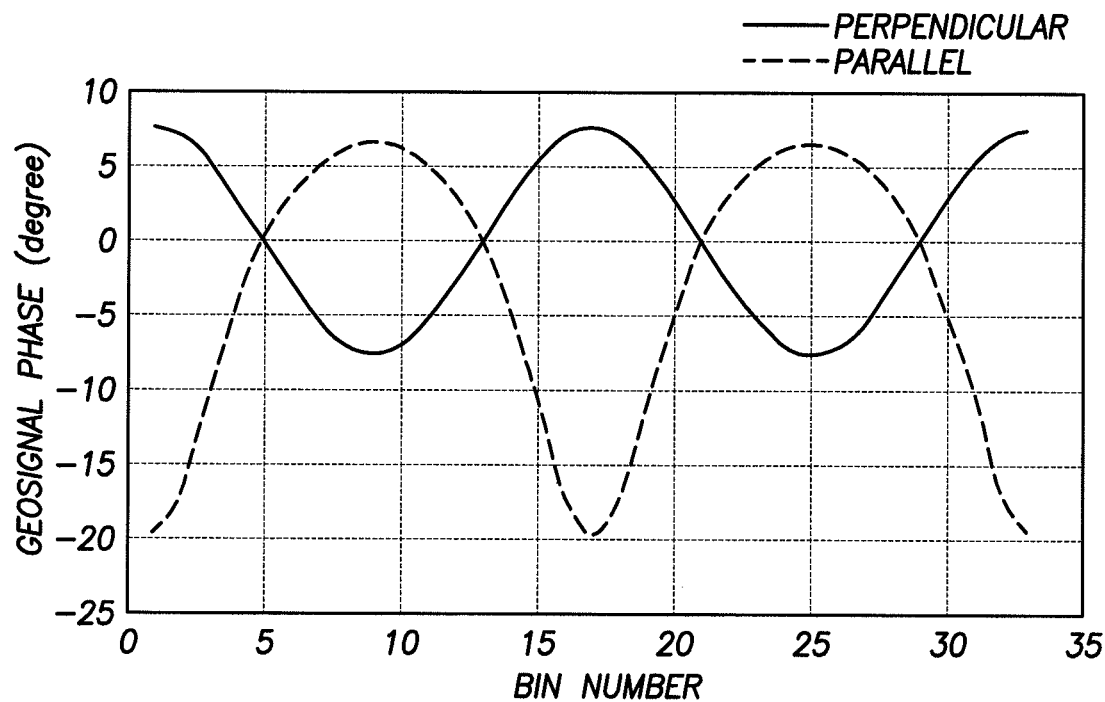
FIG. 13c depicts geosignal phase of 32 bins computed from Eq. (5c) in accordance with an exemplary embodiment of the present invention.
Figure 13D:
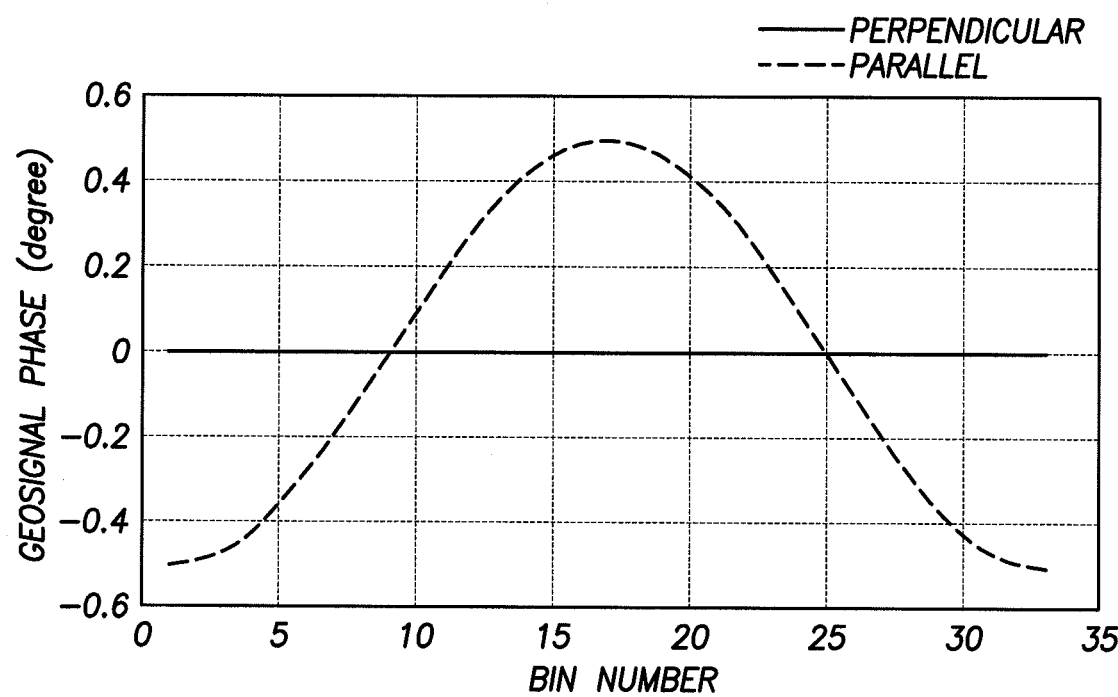
FIG. 13d depicts geosignal phase of 32 bins computed from Eq. (5b) in accordance with an exemplary embodiment of the present invention.
Figure 13E:
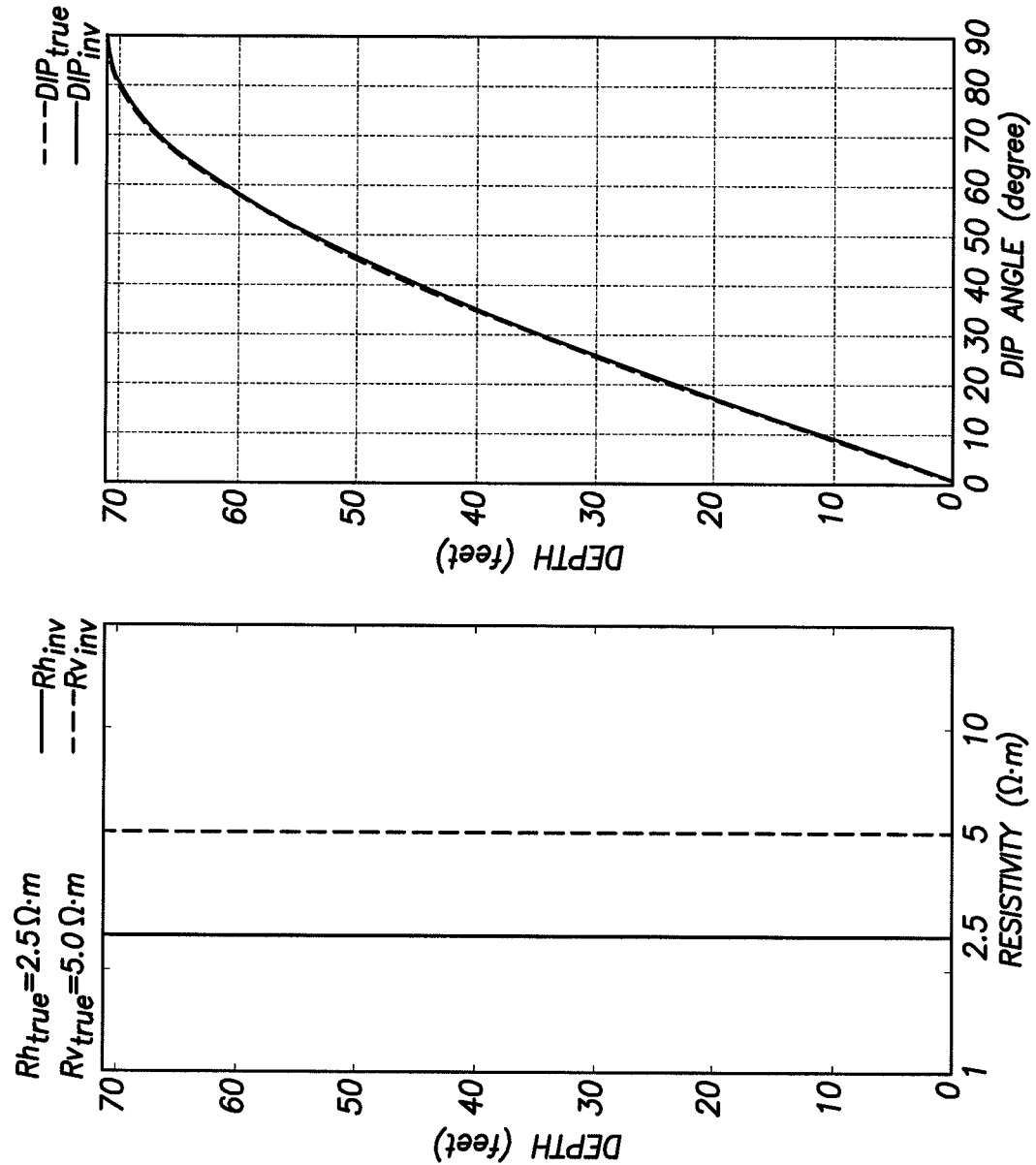
FIG. 13e depicts the inverted horizontal resistivity (Rh), vertical resistivity (Rv) and dipping from the geosignals of Eq. (5) in accordance with an exemplary embodiment of the present invention.

FIGS. 13c and 13d show the geosignal phase of 32 bins in a homogenous anisotropic medium with a dip angle of 80°. The curves shown in FIG. 13c are computed using Eq. (5c) and the curves shown in FIG. 13d are computed using Eq. (5b). FIG. 13c. shows that there are two bins with maximum geosignal phase and two bins with minimum geosignal phase. One of these two sets of bins is parallel to the normal direction of formation anisotropy while the other set is perpendicular to the direction of formation anisotropy. FIG. 13d shows the two bins with the maximum and minimum geosignal phase of the parallel system. This characteristics can be used to determine the formation strike angle. FIG. 13e shows the computed Rh, Rv and dip angle by inversion using the Levenberg-Marquardt method from the geosignals defined in Eq. (5). The Levenberg-Marquardt method is well known to those of ordinary skill in the art and will therefore not be discussed in detail herein. As shown in FIG. 13e, anisotropy and dip from 1° to 90° can be determined by the inversion from the geosignals defined in Eq. (5).

Figure 14:
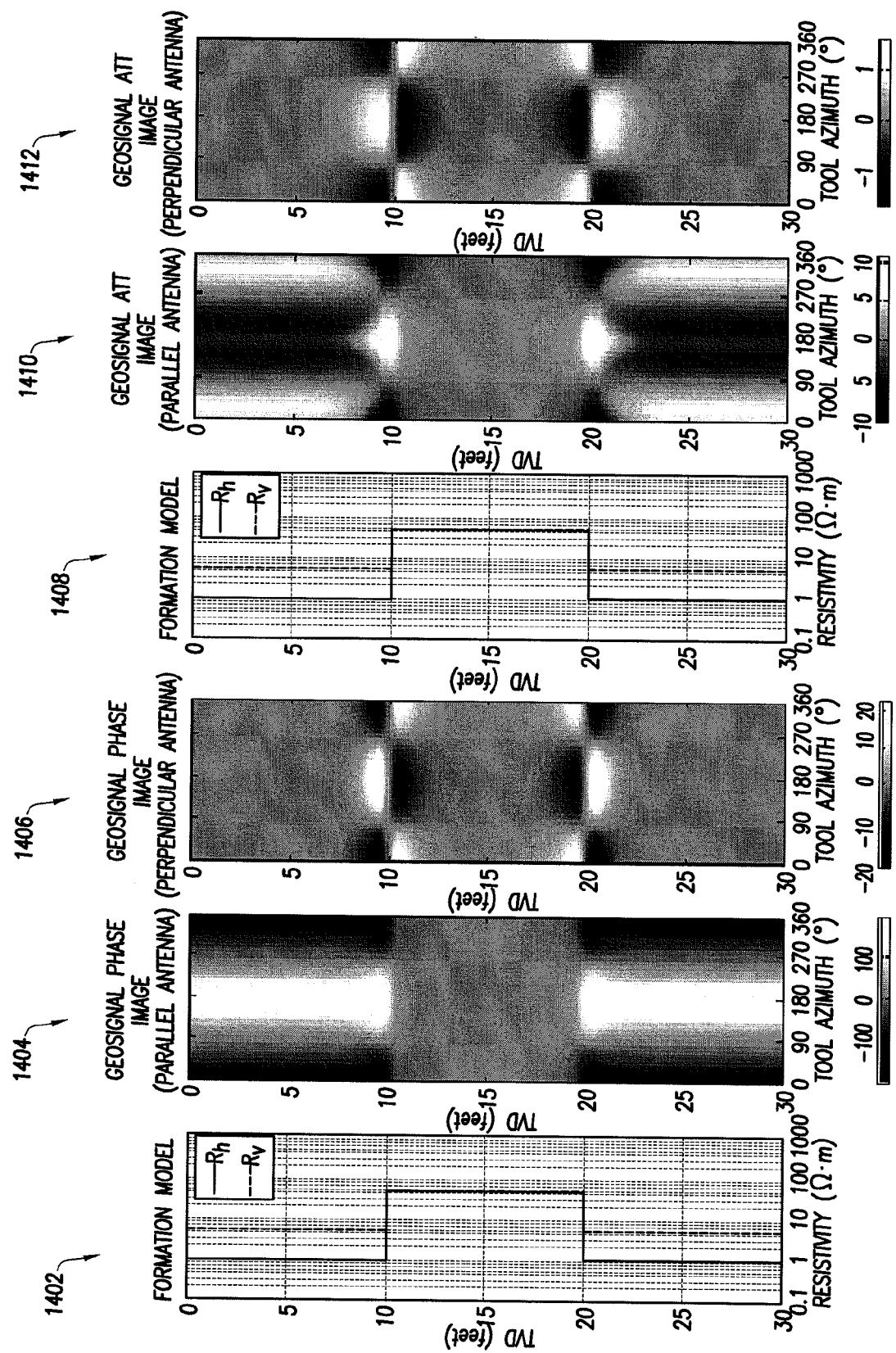
FIG. 14 shows geosignal phase and attenuation image in all azimuthal directions for the formation of FIG. 12 obtained in accordance with an exemplary embodiment of the present invention.
Figure 15A:
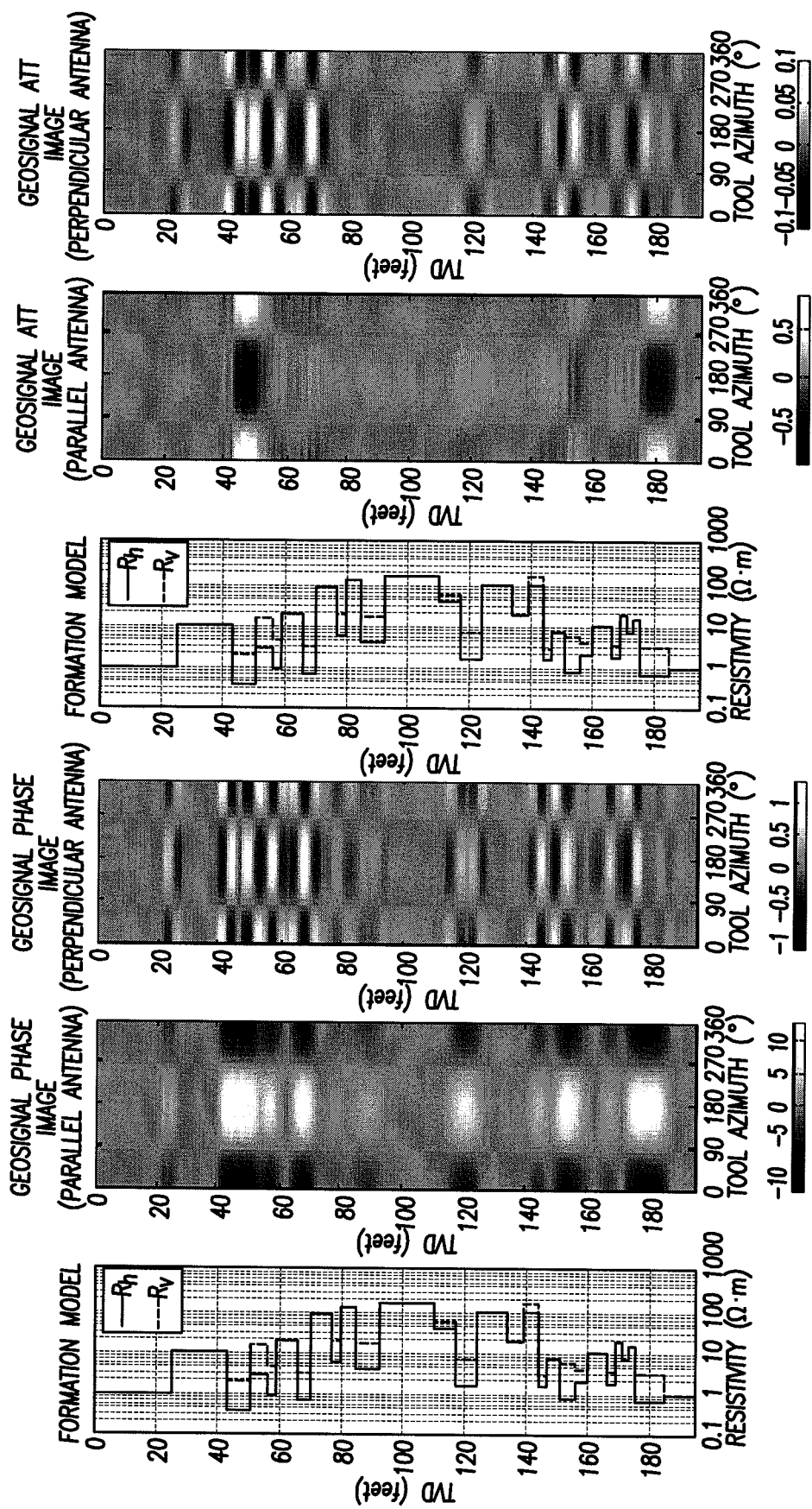
FIG. 15a shows geosignal phase and attenuation image in the Oklahoma formation model with a relative dip angle of 0° obtained in accordance with an exemplary embodiment of the present invention.
Figure 15B:
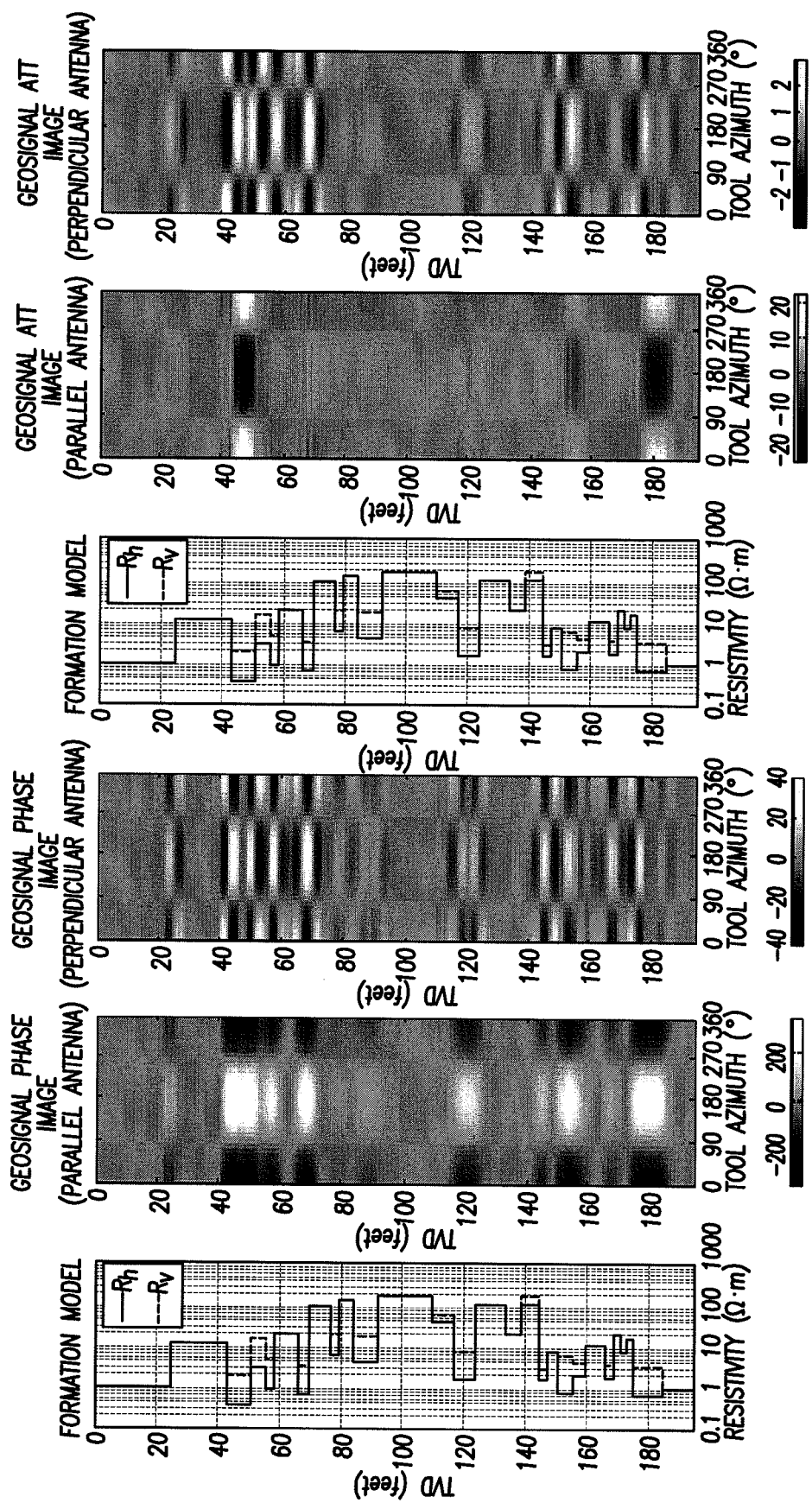
FIG. 15b shows geosignal phase and attenuation image in the Oklahoma formation model with a relative dip angle of 30° obtained in accordance with an exemplary embodiment of the present invention.
Figure 15C:
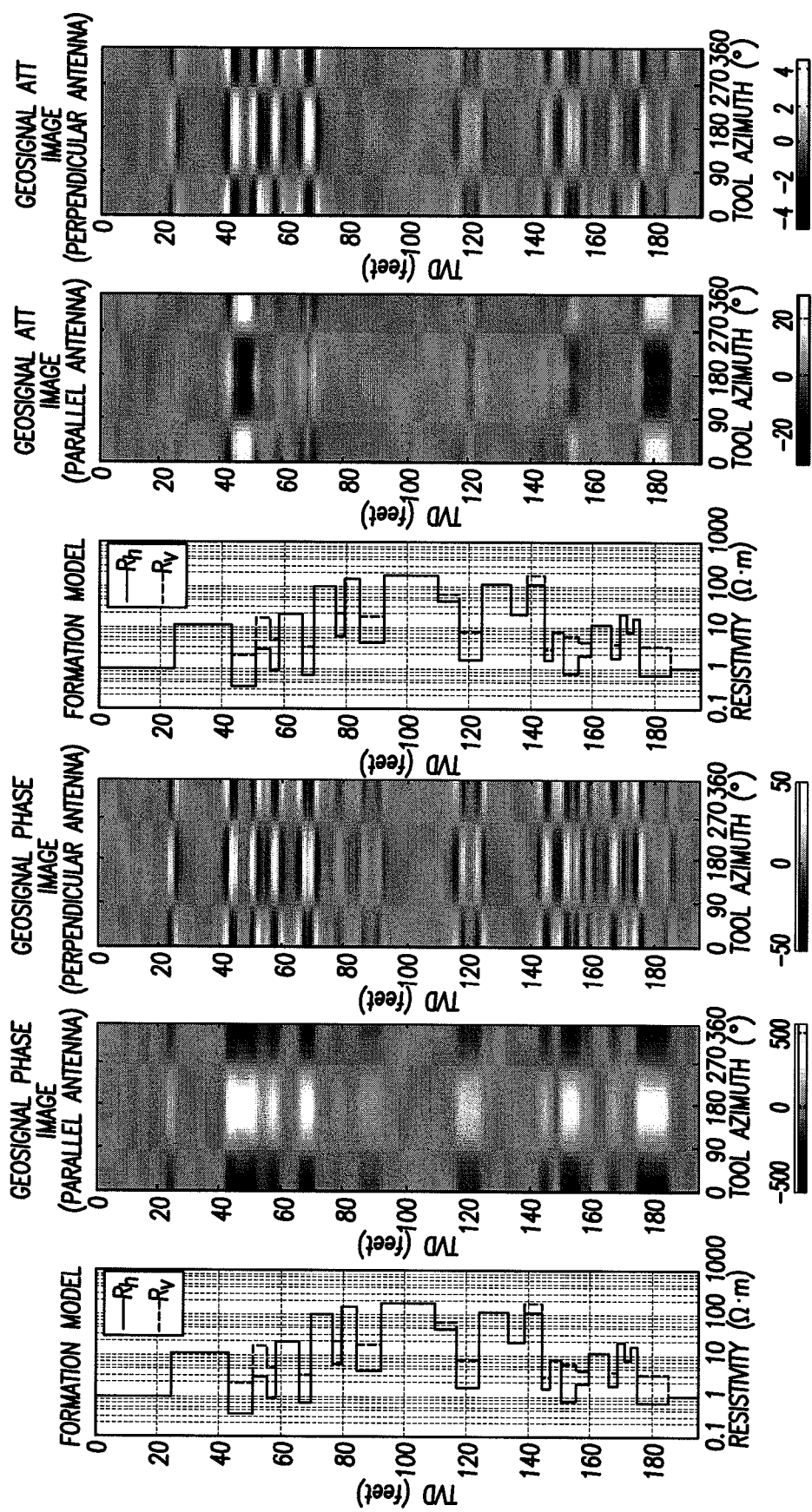
FIG. 15c shows geosignal phase and attenuation image in the Oklahoma formation model with a relative dip angle of 60° obtained in accordance with an exemplary embodiment of the present invention.
Figure 15D:
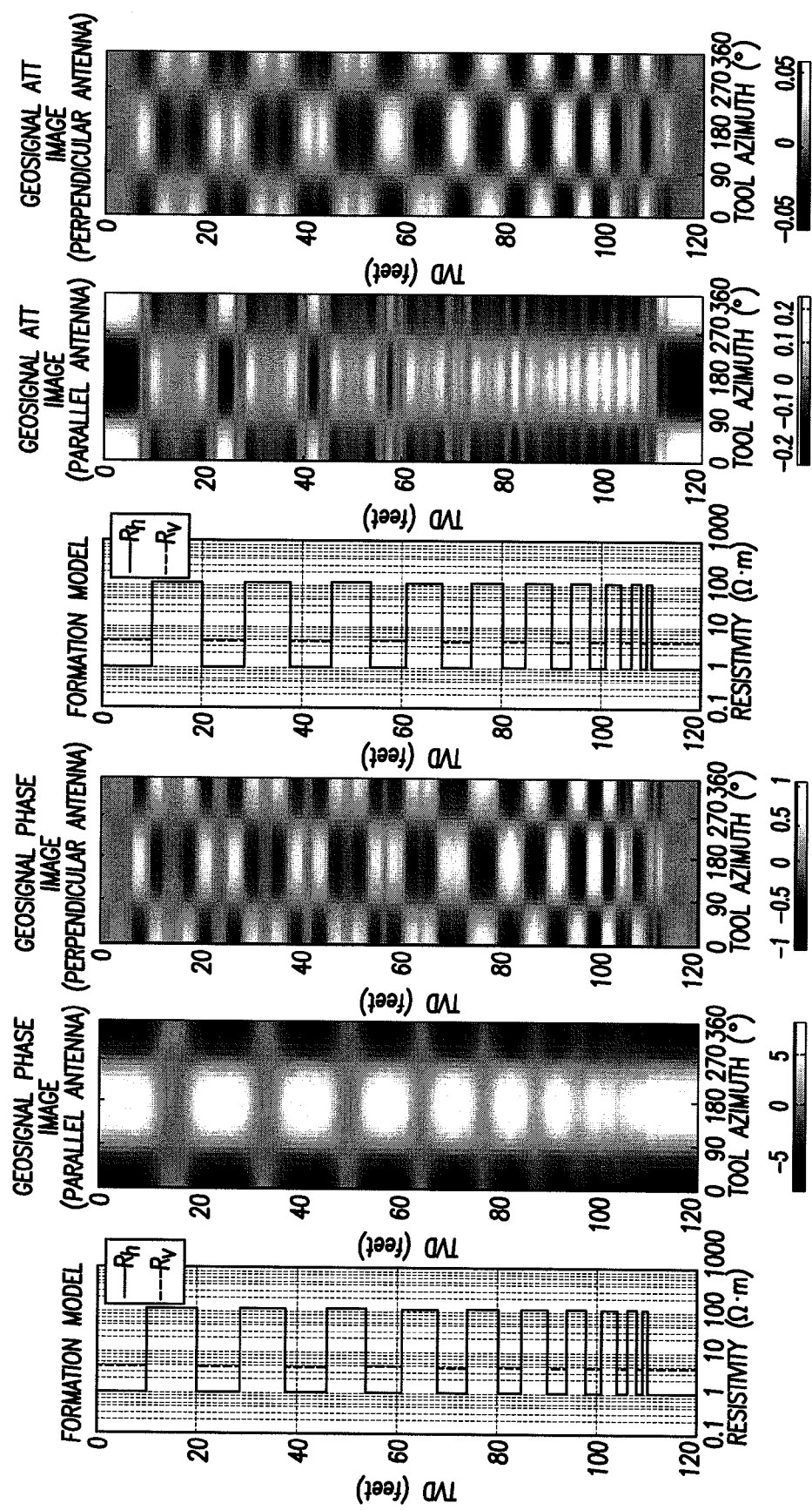
FIG. 15d shows geosignal phase and attenuation image in the Chirp formation model with a relative dip angle of 0° obtained in accordance with an exemplary embodiment of the present invention.
Figure 15E:
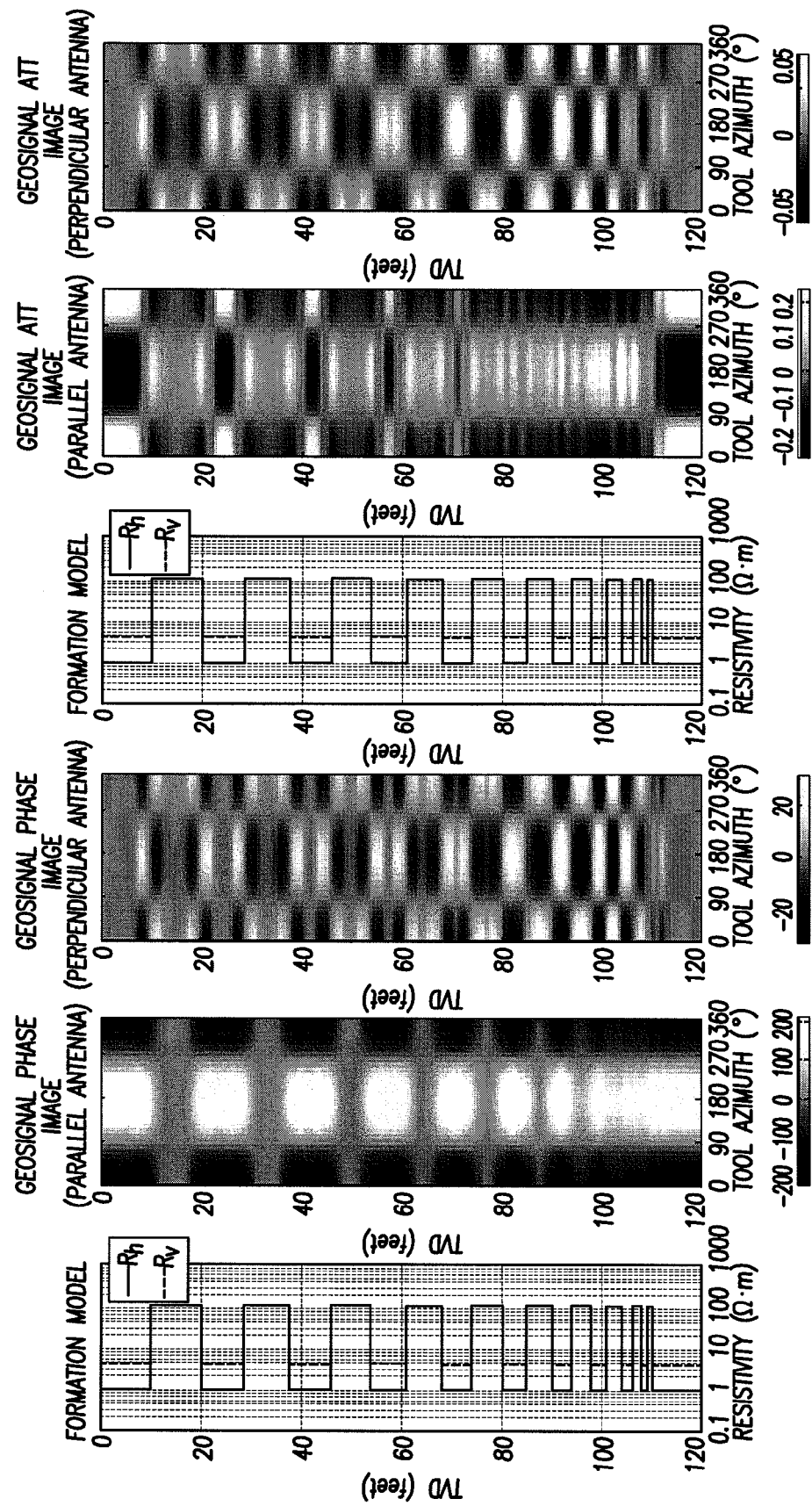
FIG. 15e shows geosignal phase and attenuation image in the Chirp formation model with a relative dip angle of 30° obtained in accordance with an exemplary embodiment of the present invention.
Figure 15F:
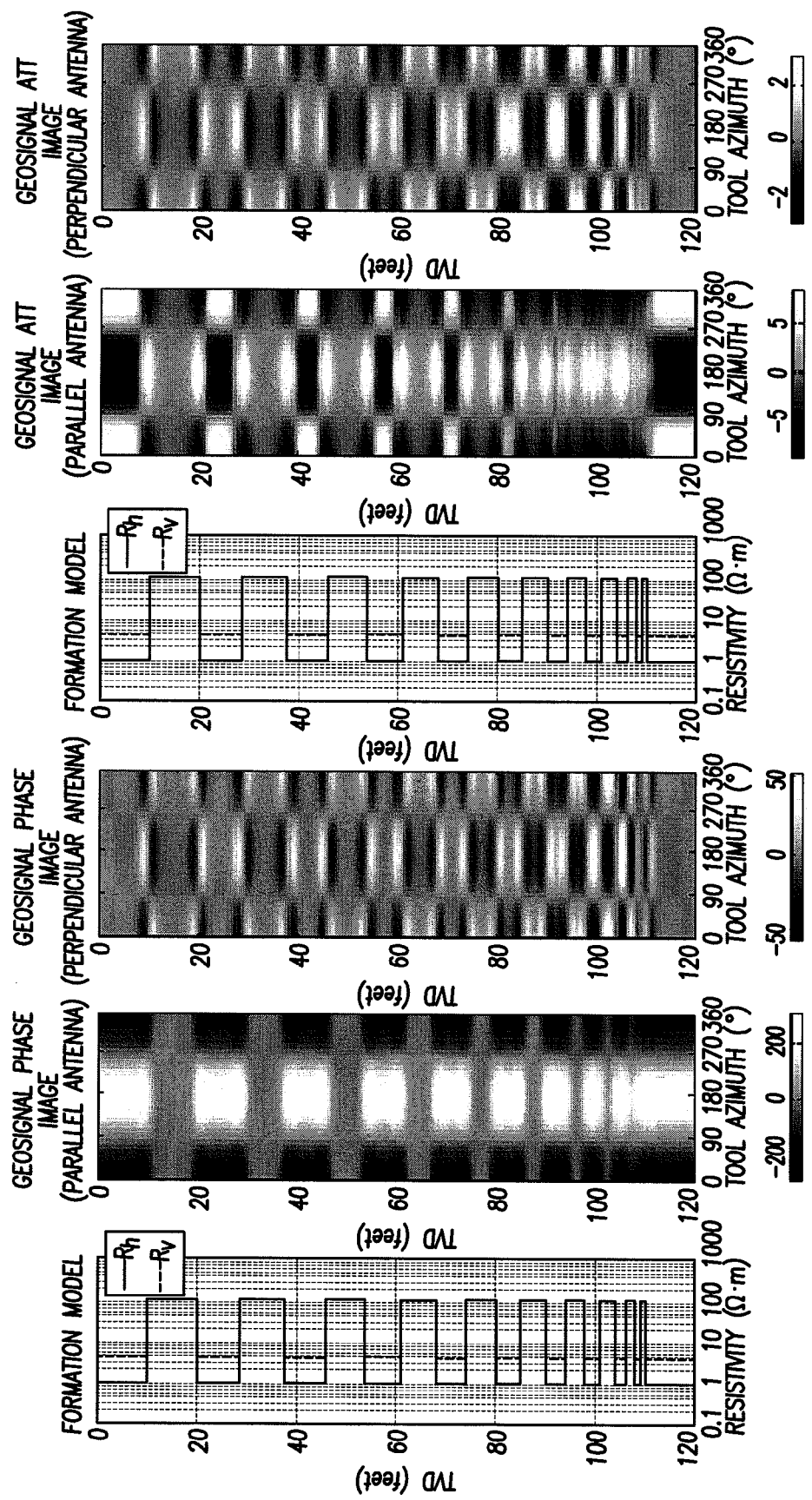
FIG. 15f shows geosignal phase and attenuation image in the Chirp formation model with a relative dip angle of 60° obtained in accordance with an exemplary embodiment of the present invention.

FIG. 14 shows the geosignal images corresponding to FIG. 12, but in all azimuthal directions. Specifically, 1402, 1408 depict the formation model and represent the change in the horizontal resistivity (Rh) and the vertical resistivity (Rv) for different points in the formation structure of FIG. 12 as shown by the True Vertical Depth ("TVD"). 1404 shows the geosignal phase image for the parallel antenna system at different points in the formation structure of FIGS. 12 and 1406 shows the same information for the perpendicular antenna system. In contrast 1410 and 1412 show the geosignal attenuation image at different points in the formation structure of FIG. 12 for the parallel and the perpendicular antenna system, respectively.

As shown in FIG. 14, both the parallel and the perpendicular system have no signal in an isotropic formation. In contrast, in anisotropic layers, while the perpendicular system still has no signal, the parallel system demonstrates a strong signal. Only when the tool is approaching the boundary both systems demonstrate signals, and the bin having the maximum value in the perpendicular system will face or be opposite the boundary whereas the bin with the maximum geosignal-phase in the parallel system will point to the boundary.

In order to characterize the defined geosignal responses of the proposed antenna structures of FIG. 8, synthetic responses using the same operating conditions (32", 500 kHz) are presented in two specific formation models. The first is the Oklahoma formation model and the second is the Chirp formation model. Specifically, the Oklahoma formation model provides multiple layers, each with different bed resistivity and bed thickness. Additionally, the presented model may be modified with anisotropy in several layers of the Oklahoma model. In contrast, the Chirp formation model consists of two layers with the same thickness, where one is an isotropic medium with a resistivity (Rt) of 100 Ω-m and the other is an anisotropic formation with a horizontal resistivity (Rh) of 1 Ω-m and vertical resistivity (Rv) of 4 Ω-m. These two layers are repeated with decreasing thickness from 10 ft to 1 ft in TVD.

FIG. 15a-15f show the defined geosignal responses in Eq. (5d) of both models but with distinct relative dip angles of 1°, 30°, and 60°. As illustrated in FIG. 15, responses are sensitive to formation anisotropy even at very low dipping angles. Moreover, defined geosignal responses from parallel and perpendicular antenna systems may be combined and utilized to directly determine formation anisotropy and further to locate boundary positions.

Accordingly, the present application discloses several antenna structures of an electromagnetic logging tool, defines various geosignal responses corresponding to the proposed antenna structures, and presents the modeling responses of geosignal signals in different formation models. As a result, formation anisotropy and formation boundaries may be identified using defined geosignal responses of both parallel and perpendicular antenna structures. The proposed methodology is simpler and more accurate than applying 1D inversion of traditional MWD tool measurements.

As would be appreciated by those of ordinary skill in the art, with the benefit of this disclosure, all or some of the method steps disclosed herein may be performed by an information handling system. In one exemplary embodiment, data obtained by the electromagnetic logging tool may be provided to an information handling system. The electromagnetic logging tool may be communicatively coupled to the information handling system through a wired or wireless data transmission system. Such systems are well known to those of ordinary skill in the art and will therefore not be discussed in detail herein. The information handling system may received the data from the electromagnetic logging tool and process the data in accordance with an exemplary embodiment of the present invention. Additionally, all or part of the data received or the values determined when performing the process steps disclosed herein may be stored in computer-readable media by the information handling system. Moreover, although several steps are disclosed in conjunction with the methods disclosed herein, as would be appreciated by those of ordinary skill in the art, with the benefit of this disclosure, one or more of the disclosed steps may be eliminated without departing from the scope of the present disclosure.

The present invention is therefore well-adapted to carry out the objects and attain the ends mentioned, as well as those that are inherent therein. While the invention has been depicted, described and is defined by references to examples of the invention, such a reference does not imply a limitation on the invention, and no such limitation is to be inferred. The invention is capable of considerable modification, alteration and equivalents in form and function, as will occur to those ordinarily skilled in the art having the benefit of this disclosure. The depicted and described examples are not exhaustive of the invention. Consequently, the invention is intended to be limited only by the spirit and scope of the appended claims, giving full cognizance to equivalents in all respects.

What is claimed is:

1. A method for characterizing a formation comprising:
    placing a tool in the formation;
        wherein the tool comprises a perpendicular antenna set and a parallel antenna set;
        wherein the perpendicular antenna set comprises at least one first transmitter antenna oriented perpendicular to at least one first receiver antenna;
        wherein the parallel antenna set comprises at least one second transmitter antenna oriented parallel to at least one second receiver antenna;
    obtaining first data from the at least one first receiver antenna and second data from the at least one second receiver antenna;
    using the first data to determine a first defined geosignal response for the perpendicular antenna set and the second data to determine a second defined geosignal response for the parallel antenna set, the first defined geosignal response and the second defined geosignal response having modified sensitivity to a first formation parameter;
    determining the first formation parameter using the first defined geosignal response and the second defined geosignal response.

2. The method of claim 1, wherein determining the first formation parameter comprises identifying at least one of an isotropic formation, an anisotropic formation, a tool around boundary, and a tool across boundary.

3. The method of claim 2, wherein identifying an isotropic formation comprises determining that the first defined geosignal response and the second defined geosignal response are below a minimum threshold value.

4. The method of claim 2, wherein identifying an anisotropic formation comprises determining that the second defined geosignal response exceeds the minimum threshold value and the first defined geosignal response is less than the minimum threshold value.

5. The method of claim 2, wherein identifying a tool around boundary comprises determining that both the first defined geosignal response and the second defined geosignal response exceed the minimum threshold value.

6. The method of claim 2, wherein identifying a tool across boundary comprises determining that the first defined geosignal response at least one of changes from a positive value to a negative value and changes from a negative value to a positive value.

7. The method of claim 1, wherein the tool is an electromagnetic logging tool.

8. The method of claim 1, wherein at least one of obtaining first data from the at least one first receiver antenna and second data from the at least one second receiver antenna, using the first data to determine the first defined geosignal response and the second data to determine a second defined geosignal response, and determining the first formation parameter using the first compensated geosignal and the second defined geosignal response is performed by an information handling system.

9. A system for analyzing a formation comprising:
    a logging tool for obtaining data from the formation;
        wherein the logging tool comprises at least one parallel antenna set and at least one perpendicular antenna set;
        wherein the parallel antenna set comprises at least one second transmitter antenna oriented parallel to at least one second receiver antenna;
        wherein the perpendicular antenna set comprises at least one first transmitter antenna oriented perpendicular to at least one first receiver antenna; and an information handling system;
- wherein the information handling system receives first data from the at least one first receiver antenna and second data from the at least one second receiver antenna;
- wherein the information handling system determines a first defined geosignal response for the perpendicular antenna set based on the first data and a second defined geosignal response for the parallel antenna set based on the second data, the first defined geosignal response and the second defined geosignal response having modified sensitivity to a first formation parameter; and
- wherein the information handling system determines the first formation parameter using the first defined geosignal response and the second defined geosignal response.

10. The system of claim 9, wherein determining the first formation parameter comprises identifying at least one of an isotropic formation, an anisotropic formation, a tool around boundary, and a tool across boundary.

11. The system of claim 10, wherein identifying an isotropic formation comprises determining that the first defined geosignal response and the second defined geosignal response are below a minimum threshold value.

12. The system of claim 10, wherein identifying an anisotropic formation comprises determining that the second defined geosignal response exceeds the minimum threshold value and the first defined geosignal response is less than the minimum threshold value.

13. The system of claim 10, wherein identifying a tool around boundary comprises determining if both the first defined geosignal response and the second defined geosignal response exceed the minimum threshold value.

14. The system of claim 10, wherein identifying a tool across boundary comprises determining if the first defined geosignal response at least one of changes from a positive value to a negative value and changes from a negative value to a positive value.

* * * * *